(12) United States Patent
Schmitt et al.

(10) Patent No.: US 7,144,954 B2
(45) Date of Patent: Dec. 5, 2006

(54) HIGHLY TRANSPARENT PLASTIC FOR OPTICAL MATERIALS

(75) Inventors: Bardo Schmitt, Mainz (DE); Wolfgang Klesse, Mainz (DE); Volker Kerscher, Reinheim (DE); Patrik Hartmann, Buettelborn (DE)

(73) Assignee: Röhm GmbH & Co. KG, Darmstadt (DE)

( * ) Notice: Subject to any disclaimer, the term of this patent is extended or adjusted under 35 U.S.C. 154(b) by 0 days.

(21) Appl. No.: 10/529,478

(22) PCT Filed: Sep. 13, 2003

(86) PCT No.: PCT/EP03/10194

§ 371 (c)(1), (2), (4) Date: Mar. 28, 2005

(87) PCT Pub. No.: WO2004/041775

PCT Pub. Date: May 21, 2004

(65) Prior Publication Data

US 2005/0261421 A1    Nov. 24, 2005

(30) Foreign Application Priority Data

Nov. 6, 2002 (DE) .................. 102 52 006

(51) Int. Cl.
- *C08J 3/00* (2006.01)
- *C08K 3/20* (2006.01)
- *C08L 75/00* (2006.01)
- *C08F 18/08* (2006.01)
- *C08G 8/30* (2006.01)

(52) U.S. Cl. .................. 525/123; 264/1.32; 264/1.7; 359/642; 523/106; 524/507; 524/589; 524/871; 524/881; 525/455; 526/286; 526/289; 526/321

(58) Field of Classification Search .............. 523/106; 526/286, 289, 321; 524/589, 881, 871, 507; 525/123, 455; 264/1.32, 1.7; 359/642
See application file for complete search history.

(56) References Cited

U.S. PATENT DOCUMENTS 6,019,915 A * 2/2000 Fujii et al. ............. 264/1.36

6,172,140 B1 1/2001 Toh et al.
6,342,571 B1 1/2002 Smith et al.

FOREIGN PATENT DOCUMENTS

| EP | 0 394 495 | 10/1990 |
|---|---|---|
| JP | 02 138316 | 5/1990 |
| JP | 09 302040 | 11/1997 |
| WO | 03/011925 | 2/2003 |
| WO | 03/011926 | 2/2003 |
| WO | 03/046028 | 6/2003 |

* cited by examiner

*Primary Examiner*—Patrick D. Niland
(74) *Attorney, Agent, or Firm*—Oblon, Spivak, McClelland, Maier & Neustadt, P.C.

(57) ABSTRACT

The present invention relates to mixtures containing
A) compounds of the formula (I) and (II)

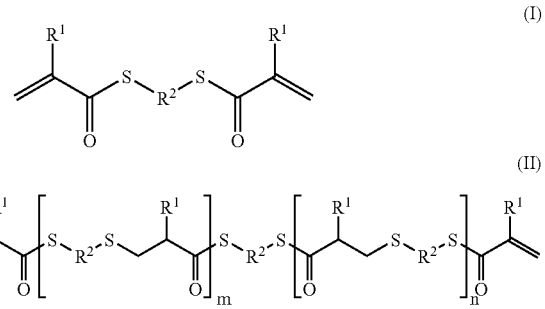

where $R^1$ is independently at each instance hydrogen or a methyl radical, $R^2$ is independently at each instance a linear or branched, aliphatic or cycloaliphatic radical or a substituted or unsubstituted aromatic or heteroaromatic radical and m and n are each independently an integer of not less than 0 subject to the proviso that m+n>0, and B) at least one ethylenically unsaturated monomer (A) which is different from the compounds of the formula (I) and (II).

The present invention further relates to processes for polymerizing these mixtures, the highly transparent polymers thus obtainable and to their use.

25 Claims, No Drawings

HIGHLY TRANSPARENT PLASTIC FOR OPTICAL MATERIALS

The present invention relates to the field of transparent plastics. More particularly, the invention relates to highly transparent plastics useful for preparing optical, especially ophthalmic, lenses.

Spectacles have become everyday articles. Especially spectacles having plastic glasses have gained importance in recent times since they are lighter and less fragile than spectacle glasses made of inorganic materials and can be coloured with suitable dyes. Plastic glasses for spectacles are generally produced using highly transparent plastics which are obtainable for example starting from diethylene glycol bis(allyl carbonate) (DAC), thiourethane compounds having α,ω-terminated multiple bonds or sulphur-containing (meth) acrylates.

DAC plastic exhibits very good impact toughness, transparency and good processibility. However, it is disadvantageous that, owing to the relatively low refractive index $n_D$ of about 1.50, not only the centre but also the edges of the plastic glasses in question have to be reinforced, so that the spectacle glasses are correspondingly thick and heavy. The wear comfort of spectacles having DAC plastic glasses is therefore distinctly reduced.

Thiourethane prepolymers having α,ω-terminated multiple bonds, which are obtained by reaction of α,ω-difunctional thiourethane prepolymers bearing two isocyanate groups with unsaturated compounds possessing Zerevitinov-active H atoms, are described for example in DD 298645. Possible applications mentioned for the thiourethane prepolymers are transparent layers or firmly adherent films. DD 298645 does not disclose any use as optical and ophthalmic lenses.

JP 5-215995 describes plastic spectacle glasses obtained by free-radical copolymerization of a ternary composition of an α,ω-di(meth)acrylate-terminated thiourethane compound having S-(phenyl-S)$_2$ units, trimethylolpropane tris(betathiopropionate) and divinylbenzene. Although the refractive index of the resultant plastics is relatively large ($n_D \geq 1.58$), the glasses have the disadvantage of a comparatively low Abbe number in the range from 28 to 36. An excessively low Abbe number leads to a higher dispersion and to coloured edges, and corresponding plastic glasses therefore have only limited usefulness as a visual aid.

JP 5-215995 is silent on the impact toughness of the plastic glasses and on their Vicat temperature.

The same applies to the plastics disclosed in WO 01/36506, which are obtained by free-radical polymerization of monomers having at least two (meth)acryloyl groups and wherein the monomers further have thiourethane and/or dithiourethane linkages within the molecule. The exemplified polymer has a refractive index of 1.60 and an Abbe number of 34 to 35. This reference too is silent on the Vicat temperature of the plastics.

A further group of transparent plastics for optical applications is disclosed in EP 0810210. The sulphur-containing (meth)acrylate monomers used, in contrast to the compounds described above, are formally derived not from the hydroxyalkyl (meth)acrylates but from the mercaptoalkyl (meth)acrylates. The plastics described in EP 0810210 comprise an improved impact toughness and a high refractive index $n_D$ in the range from 1.589 to 1.637. Compared with the plastics described in JP 5-215995, the Abbe number is only slightly up at between 27.5 and 40.7. For this reason, the plastics disclosed in EP 0810210 have only limited usefulness for spectacle glasses. Nor does this reference disclose any information with regard to the Vicat temperature of the plastics.

DE 4234251 discloses sulphur-containing polymethacrylates which are obtained by free-radical copolymerization of a monomer mixture comprising compounds of the formula (1) and (2).

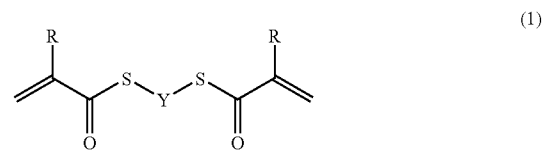

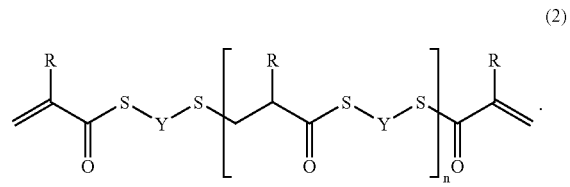

In these formulae, Y is an optionally branched, optionally cyclic alkyl radical having 2 to 12 carbon atoms or an aryl radical having 6 to 14 carbon atoms or an alkaryl radical having 7 to 20 carbon atoms, wherein the carbon chains may be interrupted by one or more ether or thioether groups. R represents hydrogen or methyl and n is an integer from 1 to 6.

In DE 4234251, the monomers of the formula (1) and (2) are generally in a molar ratio of 1:0.5 to 0.5:1. The monomer mixture is prepared by reacting at least two moles of (meth)acryloyl chloride or (meth)acrylic anhydride with one mole of a dithiol, the (meth)acryloyl chloride or (meth)acrylic anhydride in an inert organic solvent and the dithiol in an aqueous alkaline solution. Solvents mentioned as useful include methyl tert-butyl ether, toluene and xylene, the dielectric constant of which is respectively 2.6, 2.4 and 2.3 to 2.6 at 20° C.

The plastics described in DE 4234251 are colourless, rigid and somewhat brittle and have a high refractive index $n_D$ in the range from 1.602 to 1.608. The Abbe number is between 35 and 38. Therefore, these plastics too have only limited usefulness for spectacle glasses. Again, this reference does not disclose any information with regard to the Vicat temperature of the plastics.

Against that background, it is an object of the present invention to provide a reactant composition for preparing a highly transparent plastic having a very high refractive index, preferably above 1.60, and a very high Abbe number, preferably above 36, that makes it possible to prepare optical lenses. More particularly, the plastic spectacle glasses preparable shall possess low dispersion and no coloured edges.

It is a further object to provide a reactant composition for preparing a highly transparent plastic having improved mechanical properties, such as good impact toughness. Preferably, the ISO 179/1fU Charpy impact toughness of the plastic shall be greater than 3.0 kJ/m².

It is another object of the present invention to provide a reactant composition for preparing a highly transparent plastic having improved mechanical properties at temperatures above room temperature as well as at room temperature. More particularly, the plastic of the invention shall have a very high ISO 306 Vicat temperature, preferably greater than 50.0° C.

It is yet another object of the present invention that the highly transparent plastic according to the invention which is preparable from the reactant composition shall be preparable in a manner that is simple, on an industrial scale and inexpensive. More particularly, it shall be obtainable from a mixture which is flowable at standard pressure and temperatures in the range from 20.0° C. to 80.0° C., via free-radical polymerization.

It is still a further object of the present invention to indicate areas of application and possible uses for the highly transparent plastic of the invention.

These and other objects not explicitly mentioned but readily derivable or reconstruable from the contexts discussed above are achieved by a mixture having all the features of Claim 1. Advantageous modifications of the mixture according to the invention are protected in subclaims appendant to Claim 1. In addition, the highly transparent plastics obtainable from the mixtures according to the invention are claimed as are processes for their preparation. The use category claim is to a preferred use of the highly transparent plastic according to the invention. An optical, preferably ophthalmic, lens comprising the highly transparent plastic according to the invention is described in a further product claim.

By providing a mixture containing
A) compounds of the formula (I) and (II)

a reactant composition for the production of a highly transparent plastic which is very suitable for optical and especially ophthalmic lenses is made available in an unforeseeable manner. The highly transparent plastic of the invention comprises a previously unknown combination of outstanding properties, such as a high refractive index, a high Abbe number, a very good Charpy impact toughness and a high Vicat temperature. The corresponding plastic spectacle glasses exhibit low dispersion; there are no coloured edges.

The highly transparent plastic of the invention possesses yet further advantages. These include:

Owing to the high refractive index of the plastic according to the invention, there is no need for the centre and edges of corresponding plastic spectacle glasses to be reinforced and thus thickened, the wear comfort of such spectacles is distinctly improved by the comparatively low weight.

The very good impact toughness of the plastic according to the invention protects the corresponding plastic spectacle glasses against everyday dangers. Damage or irreparable destruction, especially of thin spectacle glasses by mechanical force is substantially prevented.

The highly transparent plastic of the invention possesses a high ISO 306 Vicat temperature of preferably greater than 50.0° C. and therefore retains its excellent

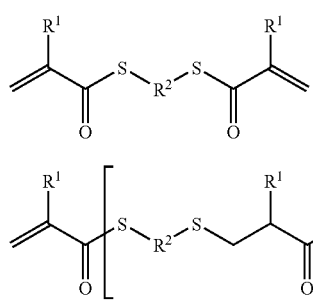

(I)

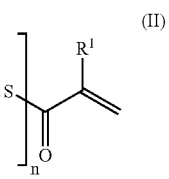

(II)

where $R^1$ is independently at each instance hydrogen or a methyl radical, $R^2$ is independently at each instance a linear or branched, aliphatic or cycloaliphatic radical or a substituted or unsubstituted aromatic or heteroaromatic radical and m and n are each independently an integer of not less than 0 subject to the proviso that m+n>0, and B) at least one ethylenically unsaturated monomer (A) which is different from the compounds of the formula (I) and (II), mechanical properties, especially the high impact strength and its hardness, up to this temperature.

The highly transparent plastic of the invention is simply, industrially and inexpensively preparable by free-radical copolymerization of a monomer mixture which is preferably flowable at standard pressure and temperatures in the range from 20.0° C. to 80.0° C.

The underlying monomer mixture is likewise simple and inexpensive to prepare on an industrial scale.

The present invention relates to mixtures which contain compounds of the formula (I) and (II)

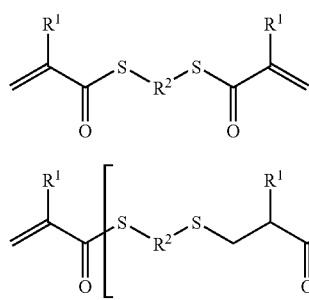

(I)

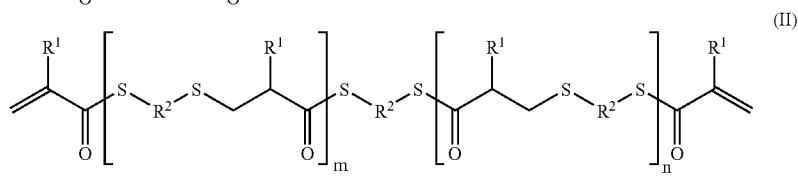

(II)

Here the radical $R^1$ is independently at each instance hydrogen or a methyl radical, preferably a methyl radical.

$R^2$ is independently at each instance a linear or branched, aliphatic or cycloaliphatic radical or a substituted or unsubstituted aromatic or heteroaromatic radical, for example a methylene, ethylene, propylene, isopropylene, n-butylene, isobutylene, t-butylene or cyclohexylene group or divalent aromatic or heteroaromatic groups derived from benzene, naphthalene, biphenyl, diphenyl ether, diphenylmethane, diphenyldimethylmethane, bisphenone, diphenyl sulphone, quinoline, pyridine, anthracene and phenanthrene. Cycloaliphatic radicals for the purposes of the present invention also comprehend bi-, tri- and polycyclic aliphatic radicals.

The radical $R^2$ further comprehends radicals of the formula

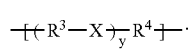

(Ia)

where $R^3$ is independently at each instance a linear or branched, aliphatic or cycloaliphatic radical, for example a methylene, ethylene, propylene, isopropylene, n-butylene, isobutylene, t-butylene or cyclohexylene group. Each X is independently oxygen or sulphur and $R^4$ represents a linear or branched, aliphatic or cycloaliphatic radical, for example a methylene, ethylene, propylene, isopropylene, n-butylene, isobutylene, t-butylene or cyclohexylene group. Cycloaliphatic radicals for the purposes of the present invention also comprehend bi-, tri- and polycyclic aliphatic radicals. y is an integer between 1 and 10, especially 1, 2, 3 and 4.

Preferred radicals of the formula (IIa) include:

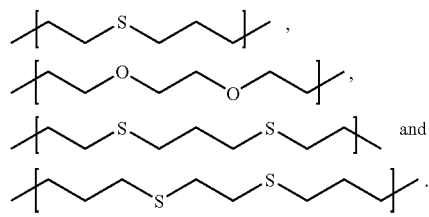

$R^2$ is preferably an aliphatic radical of 1 to 10 carbon atoms, preferably a linear aliphatic radical of 2 to 8 carbon atoms.

The indices m and n are each independently an integer of not less than 0, for example 0, 1, 2, 3, 4, 5 or 6. This is subject to the proviso that the sum m+n is greater than 0, preferably in the range from 1 to 6, advantageously in the range from 1 to 4 and especially 1, 2 or 3.

The compounds of the formula (I) and also the compounds of the formula (II) can each be used individually or else as a mixture of plural compounds of the formula (I) and (II) respectively.

The relative fractions of the compounds of the formula (I) and (II) in the monomer mixture according to the present invention are in principle discretionary, they can be used to tailor the performance profile of the plastic of the present invention to the requirements of the intended use. For example, it can be extremely advantageous for the monomer mixture to contain a distinct excess of a compound or compounds of the formula (I) or a compound or compounds of the formula (II), each based on the total amount of compounds of the formula (I) and (II).

However, it is particularly beneficial for the purposes of the present invention that the mixture should contain more than 10 mol %, preferably more than 12 mol % and especially more than 14 mol %, based on the total amount of the compounds of the formula (I) and (II), of compounds of the formula (II) where m+n=2.

It is further particularly beneficial according to the present invention to use mixtures in the process which contain more than 5.8 mol %, advantageously more than 6.5 mol % and especially more than 7.5 mol %, based on the total amount of the compounds of the formula (I) and (II), of compounds of the formula (II) where m+n=3. The fraction of compounds (I) is preferably in the range from 0.1 to 50.0 mol %, advantageously in the range from 10.0 to 45.0 mol % and especially in the range from 20.0 to 35.0 mol %, based on the total amount of compounds of the formula (I) and (II). The fraction of compounds (II) where m+n=1 is preferably above 30.0 mol %, advantageously above 35.0 mol % and especially above 40 mol %, based on the total amount of compounds of the formula (I) and (II). The fraction of compounds (II) where m+n>3 is preferably above 0 mol %, advantageously above 1 mol % and especially above 2 mol %, based on the total amount of compounds of the formula (I) and (II).

Processes for preparing the compounds of the formula (I) and (II) will be known to one skilled in the art, for example from DE 4234251, the disclosure of which is hereby explicitly incorporated herein by reference. Nonetheless, it has been determined to be particularly beneficial in the context of the present invention for a mixture of the compounds of the formula (I) and (II) to be prepared by a process in which 1.0 to <2.0 mol, preferably 1.1 to 1.8 mol, advantageously 1.2 to 1.6 mol and especially 1.2 to 1.5 mol of at least one compound of the formula (III)

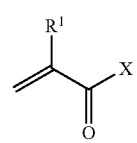

(III)

are reacted with one mole of at least one polythiol of the formula (IV)

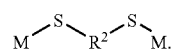

(IV)

The X radical represents chlorine or a radical

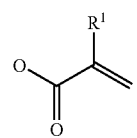

i.e. the compounds of the formula (III) encompass acryloyl chloride, methacryloyl chloride, acrylic anhydride and methacrylic anhydride, and the use of acrylic anhydride, methacrylic anhydride or mixtures thereof is particularly preferred.

M is independently at each instance hydrogen or a metal cation. Preferred metal cations are derived from elements having an electronegativity of less than 2.0 and advantageously of less than 1.5, and alkali metal cations, especially $Na^+$, $K^+$, $Rb^+$ and $Cs^+$ and alkaline earth metal cations, especially $Mg^{2+}$, $Ca^{2+}$, $Sr^{2+}$ and $Ba^{2+}$, are particularly preferred. Very particularly beneficial results are obtainable with the metal cations $Na^+$ and $K^+$.

Polythiols of the formula (IV) which are particularly suitable in this context include 1,2-ethanedithiol, 1,2-propanedithiol, 1,3-propanedithiol, 1,2-butanedithiol, 1,3-butanedithiol, 1,4-butanedithiol, 2-methylpropane-1,2-dithiol, 2-methylpropane-1,3-dithiol, 3,6-dioxa-1,8-octanedithiol, ethylcyclohexyl dimercaptans obtainable by reaction of 4-ethenylcyclohexene with hydrogen sulphide, orthobis(mercaptomethyl)benzene, meta-bis(mercaptomethyl)benzene, para-bis(mercaptomethyl)benzene, compounds of the formula

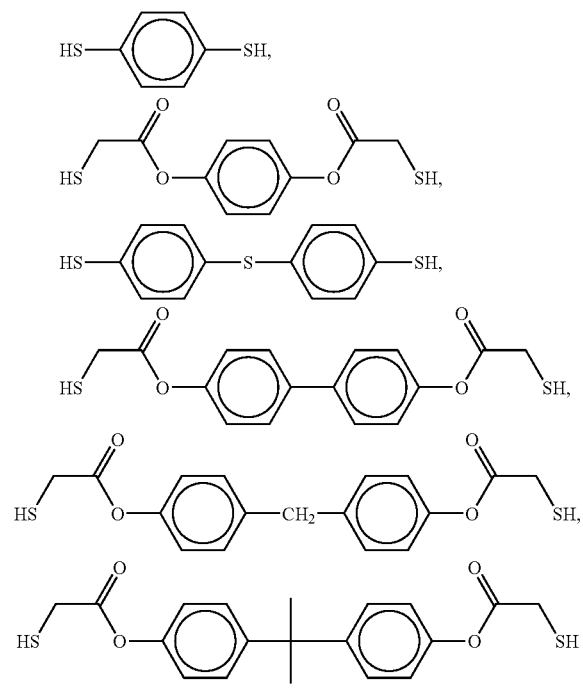

and also compounds of the formula

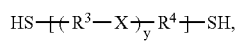

where each $R^3$ is independently a linear or branched, aliphatic or cycloaliphatic radical, for example a methylene, ethylene, propylene, isopropylene, n-butylene, isobutylene, t-butylene or cyclohexylene group. Cycloaliphatic radicals for the purposes of the present invention also comprehend bi-, tri- and polycyclic aliphatic radicals. Each X is independently oxygen or sulphur and $R^4$ represents a linear or branched, aliphatic or cycloaliphatic radical, for example a methylene, ethylene, propylene, isopropylene, n-butylene, isobutylene, t-butylene or cyclohexylene group. Cycloaliphatic radicals for the purposes of the present invention also comprehend bi-, tri- and polycyclic aliphatic radicals. y is an integer between 1 and 10, especially 1, 2, 3 and 4.

Preferred compounds of the formula (IVa) include:

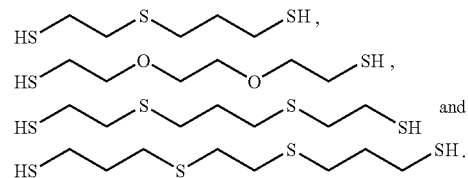

A very particularly preferred embodiment of the present invention utilizes 1,2-ethanedithiol as a compound of the formula (IV).

In this process, the compound or compounds of the formula (III) is(are) reacted in at least one inert organic solvent L and the compound or compounds of the formula (IV) in an aqueous alkaline solution, the term "inert organic solvent" denoting organic solvents which do not react with the compounds in the reaction system under the particular reaction conditions.

At least one solvent L shall have a relative dielectric constant >2.6, preferably >3.0, advantageously >4.0 and especially >5.0, measured at 20° C. in each case. In this context, the relative dielectric constant is a dimensionless number which indicates by how much the capacitance C of an (in theory) evacuated condenser increases on introducing a dielectric between the plates. This value is measured at 20° C. and extrapolated to low frequencies ($\omega \rightarrow 0$). For further details, reference is made to the usual technical literature, especially to Ullmann Encyklopädie der technischen Chemie, volume 2/1 Anwendung physikalischer und physikalisch-chemischer Methoden im Laboratorium, "Dielektrizitätskonstante", pp. 455–479. Dielectric values of solvents are reported inter alia in the Handbook of Chemistry and Physics, 71st edition, CRC Press, Baco Raton, Ann Arbor, Boston, 1990–1991, pp. 8–44, 8–46 and 9—9 to 9–12.

It is further particularly advantageous for the purposes of this process for the solvent and the aqueous solution to form two phases during the reaction and not to be homogeneously miscible. For this purpose, the solvent preferably has a water solubility (as measured at 20° C.) of less than 10 g of water based on 100 g of solvent.

Solvents L which are preferred according to the present invention include aliphatic ethers, such as diethyl ether (4.335), dipropyl ether, diisopropyl ether;

cycloaliphatic ethers, such as tetrahydrofuran (7.6);

aliphatic esters, such as methyl formate (8.5), ethyl formate, propyl formate, methyl acetate, ethyl acetate, n-butyl acetate (5.01), methyl propionate, methyl butyrate (5.6), ethyl butyrate, 2-methoxyethyl acetate;

aromatic esters, such as benzyl acetate, dimethyl phthalate, methylbenzoate (6.59), ethyl benzoate (6.02), methyl salicylate, ethyl salicylate, phenyl acetate (5.23);

aliphatic ketones, such as acetone, methyl ethyl ketone (18.5), 2-pentanone (15.4), 3-pentanone (17.0), methyl isoamyl ketone, methyl isobutyl ketone (13.1);

aromatic ketones, such as acetophenone;

nitroaromatics, such as nitrobenzene, o-nitrotoluene (27.4), m-nitrotoluene (23), p-nitrotoluene;

halogenated aromatics, such as chlorobenzene (5.708), o-chlorotoluene (4.45), m-chlorotoluene (5.55), p-chlorotoluene (6.08), o-dichlorobenzene, m-dichlorobenzene;

heteroaromatics, such as pyridine, 2-methylpyridine (9.8), quinoline, isoquinoline;

or mixtures thereof, and the numbers in parentheses denote the respective, associated, relative dielectric constants at 20° C.

For the purposes of the present process, aliphatic esters and cycloaliphatic ethers, especially ethyl acetate and tetrahydrofuran, are very particularly suitable.

In the context of the present process, the solvent L can be used not only alone but also as a solvent mixture, in which case not all the solvents present in the mixture have to meet the above dielectric criterion. For example, it is possible to use tetrahydrofuran/cyclohexane mixtures according to the present invention. However, it has been determined to be advantageous for the solvent mixture to have a relative dielectric constant >2.6, preferably >3.0, advantageously >4.0 and especially >5.0, measured at 20° C. in each case. Particularly advantageous results can be achieved with solvent mixtures which exclusively contain solvents having a relative dielectric constant >2.6, preferably >3.0, advantageously >4.0 and especially >5.0, measured at 20° C. in each case.

The aqueous alkaline solution of the compound or compounds of the formula (IV) preferably contains 1.1 to 1.5 equivalents of at least one Bronsted base, based on the total amount of compound or compounds of the formula (III). Preferred Bronsted bases for the purposes of the present invention include alkali metal hydroxides and alkaline earth metal hydroxides, especially sodium hydroxide and potassium hydroxide.

The reaction may in principle be carried out in any conceivable manner. For example, it is possible for the compound or compounds of the formula (III) to be introduced as an initial charge in the solvent or solvent mixture L and for the aqueous alkaline solution of the compound or compounds of the formula (IV) to be added stepwise or continuously. Nevertheless, it has been determined to be very particularly beneficial for the present invention when the compound or compounds of the formula (III) and the compound or compounds of the formula (IV) are concurrently metered into the reaction vessel in at least one inert organic solvent L and in an aqueous alkaline solution, respectively.

The reaction temperature can be varied over a wide range, but frequently the temperature will be in the range from 20.0° C. to 120.0° C., and preferably in the range from 20.0° C. to 80.0° C. The same is true of the pressure at which the reaction is carried out. Thus, the reaction can be carried out not only at subatmospheric pressure but also at superatmospheric pressure. But preferably it will be carried out at atmospheric pressure. Although the reaction can also take place under air, it has been determined to be very particularly beneficial for the present invention for the reaction to be carried out under protective gas atmosphere, preferably nitrogen and/or argon, although it is preferable for a small oxygen fraction to be present.

It is beneficial for the reaction mixture to be reacted with a Bronsted acid in a further step until the aqueous solution has a pH at 20° C. which is preferably less than 7.0, advantageously less than 6.0 and especially less than 5.0. Useful acids in this connection include inorganic mineral acids, such as hydrochloric acid, sulphuric acid, phosphoric acid, organic acids, such as acetic acid, propionic acid, and acidic ion exchangers, especially acidic synthetic resin ion exchangers, such as ® Dowex M-31 (H) for example. The use in this connection of acidic synthetic resin ion exchangers having loadings of at least 1.0 meq, preferably at least 2.0 meq and especially at least 4.0 meq of $H^+$ ions based on 1 g of dried ion exchanger, particle sizes of 10–50 mesh and porosities in the range from 10 to 50% based on the total volume of the ion exchanger has been determined to be very particularly suitable.

To isolate the compounds of the formula (I) and (II), it is advantageous for the organic phase, which consists of the solvent L, to be separated off, washed if necessary, dried and the solvent evaporated.

The reaction of the compound or compounds of the formula (III) with the compound or compounds of the formula (IV) may be carried out in the presence of inhibitors to prevent any radical polymerization of the (meth)acryloyl groups during the reaction. These inhibitors are well known to those skilled in the art.

1,4-Dihydroxybenzenes are used in the main. However, differently substituted dihydroxybenzenes can be used as well. In general, such inhibitors can be represented by the general formula (V)

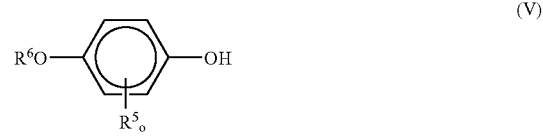

(V)

where $R^5$ is a linear or branched alkyl radical of one to eight carbon atoms, halogen or aryl, preferably an alkyl radical of one to four carbon atoms, particularly preferably methyl, ethyl, n-propyl, isopropyl, n-butyl, isobutyl, sec-butyl, tert-butyl, Cl, F or Br;

o is an integer from one to four, preferably one or two; and $R^6$ is hydrogen, a linear or branched alkyl radical of one to eight carbon atoms or aryl, preferably an alkyl radical of one to four carbon atoms, particularly preferably methyl, ethyl, n-propyl, isopropyl, n-butyl, isobutyl, sec-butyl or tert-butyl.

However, it is also possible to use compounds having 1,4-benzoquinone as a parent compound. These can be described using the formula (VI)

(VI)

where $R^5$ is a linear or branched alkyl radical of one to eight carbon atoms, halogen or aryl, preferably an alkyl radical of one to four carbon atoms, particularly preferably methyl, ethyl, n-propyl, isopropyl, n-butyl, isobutyl, sec-butyl, tert-butyl, Cl, F or Br; and o is an integer from one to four, preferably one or two.

Use is similarly made of phenols of the general structure (VII)

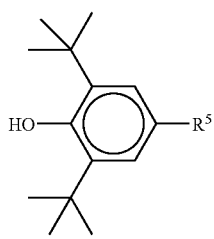

(VII)

where
R⁵ is a linear or branched alkyl radical of one to eight carbon atoms, aryl or aralkyl, propionic esters with one to four hydric alcohols which may also contain heteroatoms such as S, O and N, preferably an alkyl radical of one to four carbon atoms, particularly preferably methyl, ethyl, n-propyl, isopropyl, n-butyl, isobutyl, sec-butyl, tert-butyl.

A further advantageous class of substances is that of the hindered phenols based on triazine derivatives of the formula (VIII)

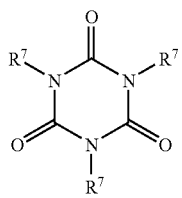

(VIII)

where R⁷=compound of formula (IX)

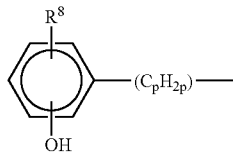

(IX)

where
$R^8 = C_pH_{2p+1}$
and p=1 or 2.

It is particularly successful to use the compounds 1,4-dihydroxybenzene, 4-methoxyphenol, 2,5-dichloro-3,6-dihydroxy-1,4-benzoquinone, 1,3,5-trimethyl-2,4,6-tris(3,5-di-tert-butyl-4-hydroxybenzyl)benzene, 2,6-di-tert-butyl-4-methylphenol, 2,4-dimethyl-6-tert-butylphenol, 2,2-bis[3,5-bis(1,1-dimethylethyl)-4-hydroxyphenyl-1-oxopropoxymethyl)]1,3-propanediyl ester, 2,2'-thiodiethyl bis[3-(3,5-di-tert-butyl-4-hydroxyphenyl)]propionate, octadecyl 3-(3,5-di-tertbutyl-4-hydroxyphenyl)propionate, 3,5-bis(1,1-dimethylethyl-2,2-methylenebis(4-methyl-6-tert-butyl)phenol, tris-(4-tert-butyl-3-hydroxy-2,6-dimethylbenzyl)-s-triazine-2,4,6-(1H,3H,5H)trione, tris(3,5-ditert-butyl-4-hydroxy)-s-triazine-2,46-(1H,3H,5H)trione or tert-butyl-3,5-dihydroxybenzene.

As a proportion of the weight of the total reaction mixture, the inhibitors, reckoned individually or as a mixture, generally amount to 0.01–0.50% (wt/wt), the concentration of the inhibitors preferably being selected so that the DIN 55945 colour number is not impaired. Many of these inhibitors are commercially available.

The mixture of the present invention contains not only the compounds of the formula (I) and (II) but further at least one ethylenically unsaturated monomer (A) which is different from the compounds of the formula (I) and (II). In principle, the monomer (A) may also be viewed as a reactive diluent for the compounds of the formula (I) and (II). Surprisingly, however, the addition of monomer (A) improves the mechanical properties of the plastics material of the present invention without adversely affecting its optical properties. In many cases, the very opposite is observed, namely a beneficial influence on the optical properties. Ethylenically unsaturated monomers (A) are very well known to one skilled in the art, they encompass all organic compounds which have at least one ethylenic double bond. These include inter alia:

nitriles of (meth)acrylic acid and other nitrogenous methacrylates, such as methacryloylamidoacetonitrile, 2-methacryloyloxyethylmethylcyanamide, cyanomethyl methacrylate;

(meth)acrylates which are derived from saturated alcohols, such as methyl (meth)acrylate, ethyl (meth)acrylate, n-propyl (meth)acrylate, isopropyl (meth)acrylate, n-butyl (meth)acrylate, sec-butyl (meth)acrylate, tert-butyl (meth)acrylate, pentyl (meth)acrylate, hexyl (meth)acrylate, heptyl (meth)acrylate, 2-ethylhexyl (meth)acrylate, octyl (meth)acrylate, nonyl (meth)acrylate, isooctyl (meth)acrylate, isononyl (meth)acrylate, 2-tert-butylheptyl (meth)acrylate, 3-isopropylheptyl (meth)acrylate, decyl (meth)acrylate, undecyl (meth)acrylate, 5-methylundecyl (meth)acrylate, dodecyl (meth)acrylate, 2-methyldodecyl (meth)acrylate, tridecyl (meth)acrylate, 5-methyl-tridecyl (meth)acrylate, tetradecyl (meth)acrylate, pentadecyl (meth)acrylate, hexadecyl (meth)acrylate, 2-methylhexadecyl (meth)acrylate, heptadecyl (meth)acrylate, 5-isopropylheptadecyl (meth)acrylate, 4-tertbutyloctadecyl (meth)acrylate, 5-ethyloctadecyl (meth)acrylate, 3-isopropyloctadecyl (meth)acrylate, octadecyl (meth)acrylate, nonadecyl (meth)acrylate, eicosyl (meth)acrylate, cetyleicosyl (meth)acrylate, stearyleicosyl (meth)acrylate, docosyl (meth)acrylate, and/or eicosyltetratriacontyl (meth)acrylate;

cycloalkyl (meth)acrylates, such as cyclopentyl (meth)acrylate, cyclohexyl (meth)acrylate, 3-vinyl-2-butylcyclohexyl (meth)acrylate, and bornyl (meth)acrylate;

(meth)acrylates which are derived from unsaturated alcohols, such as 2-propynyl (meth)acrylate, allyl (meth)acrylate and oleyl (meth)acrylate, vinyl (meth)acrylate;

aryl (meth)acrylates, such as benzyl (meth)acrylate or phenyl (meth)acrylate, and the aryl radicals may each be unsubstituted or substituted by up to four substituents;

hydroxylalkyl (meth)acrylates, such as 3-hydroxypropyl (meth)acrylate, 3,4-dihydroxybutyl (meth)acrylate, 2-hydroxyethyl (meth)acrylate, 2-hydroxypropyl (meth)acrylate, 2,5-dimethyl-1,6-hexanediol (meth)acrylate, 1,10-decanediol (meth)acrylate, 1,2-propanediol (meth)acrylate;

polyoxyethylene and polyoxypropylene derivatives of (meth)acrylic acid, such as triethylene glycol (meth)acrylate, tetraethylene glycol (meth)acrylate, tetrapropylene glycol (meth)acrylate;

di(meth)acrylates, such as 1,2-ethanediol di(meth)acrylate, 1,4-butanediol di(meth)acrylate, diethylene glycol di(meth)acrylate, dipropylene glycol di(meth)acrylate, triethylene glycol di(meth)acrylate, tripropylene glycol di(meth)acrylate, tetraethylene glycol di(meth)acrylate, tetrapropylene glycol di(meth)acrylate, polyethylene glycol di(meth)acrylate (preferably having number average molecular weights in the range from 200–5 000 000 g/mol, advantageously in the range from 200 to 25 000 g/mol and especially in the range from 200 to 1 000 g/mol), polypropylene glycol di(meth)acrylate (preferably having number average molecular weights in the range from 200–5 000 000 g/mol, advantageously in the range from 250 to 4 000 g/mol and especially in the range from 250 to 1 000 g/mol), 2,2'-thiodiethanol di(meth)acrylate (thiodiglycol di(meth)acrylate), 3,9-di(meth)acryloyloxymethyltricyclo[5.2.1.0(2.6)]decane, especially

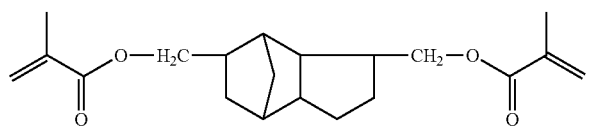

3,8-di(meth)acryloyloxymethyltricyclo[5.2.1.0(2.6)]-decane, 4,8-di(meth)acryloyloxymethyltricyclo-[5.2.1.0(2.6)]decane, 4,9-di(meth)acryloyloxymethyltricyclo[5.2.1.0(2.6)]decane, ethoxylated bisphenol A di(meth)acrylate, especially

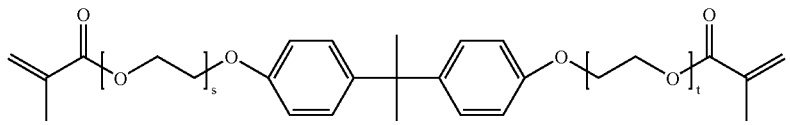

where s and t are each not less than 0 and the sum total s+t is preferably in the range from 1 to 20 and especially in the range from 2 to 10, and di(meth)acrylates obtainable by reaction of diisocyanates with 2 equivalents of hydroxyalkyl (meth)acrylate, especially

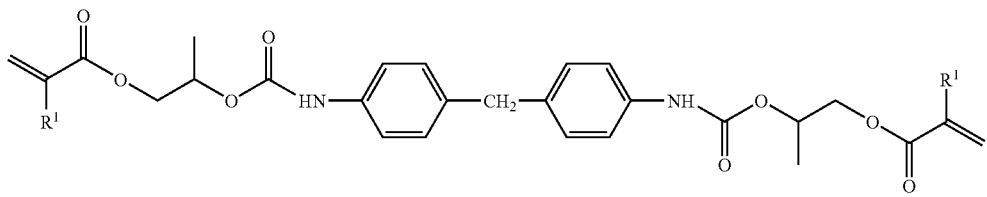

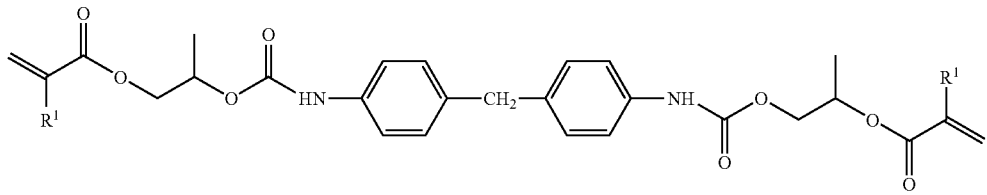

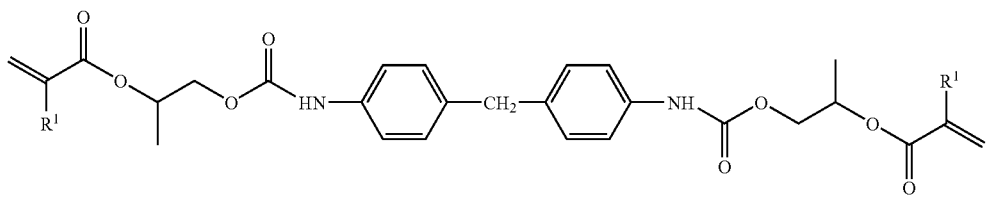

where the radical $R^1$ is independently at each instance hydrogen or a methyl radical, aminoalkyl (meth)acrylates, such as tris(2-methacryloxyethyl)amine, N-methylformamidoethyl (meth)acrylate, 2-ureidoethyl (meth)acrylate;

carbonylic (meth)acrylates, such as 2-carboxyethyl (meth)acrylate, carboxymethyl (meth)acrylate, oxazolidinylethyl (meth)acrylate, N-(methacryloyloxy)formamide, acetonyl (meth)acrylate, N-methacryloylmorpholine, N-methacryloyl-2-pyrrolidinone;

(meth)acrylates of ether alcohols, such as tetrahydrofurfuryl (meth)acrylate, vinyloxyethoxyethyl (meth)acrylate, methoxyethoxyethyl (meth)acrylate, 1-butoxypropyl (meth)acrylate, 1-methyl-(2-vinyloxy)ethyl (meth)acrylate, cyclohexyloxymethyl (meth)acrylate, methoxymethoxyethyl (meth)acrylate, benzyloxymethyl (meth)acrylate, furfuryl (meth)acrylate, 2-butoxyethyl (meth)acrylate, 2-ethoxyethoxymethyl (meth)acrylate, 2-ethoxyethyl (meth)acrylate, allyloxymethyl (meth)acrylate, 1-ethoxybutyl (meth)acrylate, methoxymethyl (meth)acrylate, 1-ethoxyethyl (meth)acrylate, ethoxymethyl (meth)acrylate;

(meth)acrylates of halogenated alcohols, such as 2,3-dibromopropyl (meth)acrylate, 4-bromophenyl (meth)acrylate, 1,3-dichloro-2-propyl (meth)acrylate, 2-bromoethyl (meth)acrylate, 2-iodoethyl (meth)acrylate, chloromethyl (meth)acrylate;

oxiranyl (meth)acrylates, such as 2,3-epoxybutyl (meth)acrylate, 3,4-epoxybutyl (meth)acrylate, glycidyl (meth)acrylate;

amides of (meth)acrylic acid, such as N-(3-dimethylaminopropyl)(meth)acrylamide, N-(diethylphosphono)(meth)acrylamide, 1-(meth)acryloylamido-2-methyl-2-propanol, N-(3-dibutylaminopropyl)(meth)acrylamide, N-t-butyl-N-(diethylphosphono)(meth)acrylamide, N,N-bis(2-diethylaminoethyl)(meth)acrylamide, 4-(meth)acryoylamido-4-methyl-2-pentanol, N-(methoxymethyl)(meth)acrylamide, N-(2-hydroxyethyl)(meth)acrylamide, N-acetyl(meth)acrylamide, N-(dimethylaminoethyl)(meth)acrylamide, N-methyl-N-phenyl(meth)acrylamide, N,N-diethyl(meth)acrylamide, N-methyl(meth)acrylamide, N,N-dimethyl(meth)acrylamide, N-isopropyl(meth)acrylamide;

heterocyclic (meth)acrylates, such as 2-(1-imidazolyl)ethyl (meth)acrylate, 2-(4-morpholinyl)ethyl (meth)acrylate and 1-(2-methacryloyloxyethyl)-2-pyrrolidone;

phosphorus-, boron- and/or silicon-containing (meth)acrylates, such as 2-(dimethylphosphato)propyl (meth)acrylate, 2-(ethylenephosphito)propyl (meth)acrylate, dimethylphosphinomethyl (meth)acrylate, dimethylphosphonoethyl (meth)acrylate, diethyl(meth)acryloylphosphonate, dipropyl(meth)acryloyl phosphate;

sulphur-containing (meth)acrylates, such as ethylsulphynylethyl (meth)acrylate, 4-thiocyanatobutyl (meth)acrylate, ethylsulphonylethyl (meth)acrylate, thiocyanatomethyl (meth)acrylate, methylsulphynylmethyl (meth)acrylate, bis((meth)acryloyloxyethyl)sulphide;

tri(meth)acrylates, such as trimethyloylpropane tri(meth)acrylate and glycerol tri(meth)acrylate;

bis(allyl carbonate)s, such as ethylene glycol bis(allyl carbonate), 1,4-butanediol bis(allyl carbonate), diethylene glycol bis(allyl carbonate);

vinyl halides, such as for example vinyl chloride, vinyl fluoride, vinylidene chloride and vinylidene fluoride;

vinyl esters, such as vinyl acetate;

styrene, substituted styrenes having an alkyl substituent in the side chain, such as for example α-methylstyrene and α-ethylstyrene, substituted styrenes having an alkyl substituent on the ring, such as vinyltoluene and p-methylstyrene, halogenated styrenes, such as for example monochlorostyrenes, dichlorostyrenes, tribromostyrenes and tetrabromostyrenes;

heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles;

vinyl and isoprenyl ethers;

maleic acid and maleic acid derivatives, such as for example mono- and diesters of maleic acid where the alcohol radicals have 1 to 9 carbon atoms, maleic anhydride, methylmaleic anhydride, maleimide, methylmaleimide;

fumaric acid and fumaric acid derivatives, such as for example mono- and diesters of fumaric acid where the alcohol radicals have 1 to 9 carbon atoms;

and also dienes, such as for example 1,2-divinylbenzene, 1,3-divinylbenzene, 1,4-divinylbenzene, 1,2-diisopropenylbenzene, 1,3-diisopropenylbenzene and 1,4-diisopropenylbenzene.

In this context, the expression (meth)acrylates comprehends methacrylates and acrylates and also mixtures thereof. Accordingly, the expression (meth)acrylic acid comprehends methacrylic acid and acrylic acid and also mixtures thereof.

The ethylenically unsaturated monomers can be used individually or as mixtures.

The monomer (A) comprehends in particular ethylenically unsaturated monomers which are copolymerizable with the compounds of the formula (I) and (II).

It has been determined to be most particularly beneficial in the context of the present invention for the mixture of the present invention to contain at least one thiourethane compound (T) as monomer (A), which is in turn obtainable by a) reaction of one equivalent of at least one diisocyanate of the formula (X)

$$OCN-R^9-NCO \qquad (X)$$

with $v_D$ equivalents of a dithiol of the general formula (XI)

$$HS-R^{10}-SH \qquad (XI)$$

or $v_D$ equivalents of a mixture comprising at least one dithiol of the general formula (II) and at least one compound of the general formula (XI)

$$HO-R^{11}\text{-}ZH \qquad (XII)$$

and b) reaction—in the presence of customary reaction-catalyzing and—stabilizing compounds—of at least one α,ω-difunctional thiourethane prepolymer of step a)

with $v_H$ equivalents of at least one hydroalkyl (meth)acrylate of the general formula (XIII)

$$CH_2=C(R^{12})-COO[CH(R^{13})]_q-CH_2-OH \qquad (XIII)$$

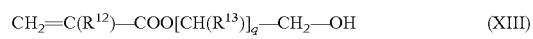

$R^9$ is a linear or branched aliphatic or cycloaliphatic radical or a substituted or unsubstituted aromatic or heteroaromatic radical, for example a methylene, ethylene, propylene, isopropylene, n-butylene, isobutylene, t-butylene, cyclohexylene group or divalent aromatic or heteroaromatic groups derived from benzene, naphthalene, biphenyl, diphenyl ether, diphenylmethane, diphenyldimethylmethane, bisphenone, diphenyl sulphone, quinoline, pyridine, anthracene and phenanthrene. Cycloaliphatic radicals for the purposes of the present invention also comprehend bi-, tri- and polycyclic aliphatic radicals. The radical $R^9$ is preferably an aliphatic radical, advantageously of 2 to 9 carbon atoms.

$v_D$ is a number in the range from 0.1 to 0.9, preferably in the range from 0.5 to 0.9 and especially a number in the range from 0.5 to 0.6. $v_D=0.5$ is most particularly advantageous for the purposes of the invention.

$R^{10}$ is a linear or branched aliphatic or cycloaliphatic radical or a substituted or unsubstituted aromatic or heteroaromatic radical, for example a methylene, ethylene, propylene, isopropylene, n-butylene, isobutylene, t-butylene, cyclohexylene group or divalent aromatic or heteroaromatic groups derived from benzene, naphthalene, biphenyl, diphenyl ether, diphenylmethane, diphenyldimethylmethane, bisphenone, diphenyl sulphone, quinoline, pyridine, anthracene and phenanthrene. Cycloaliphatic radicals for the purposes of the present invention also comprehend bi-, tri- and polycyclic aliphatic radicals.

The radical $R^{10}$ may also be selected from radicals of the formula

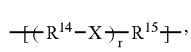 (XIa)

where each $R^{14}$ is independently a linear or branched, aliphatic or cycloaliphatic radical, for example a methylene, ethylene, propylene, isopropylene, n-butylene, isobutylene, t-butylene or cyclohexylene group. Each X is independently oxygen or sulphur and $R^{15}$ represents a linear or branched, aliphatic or cycloaliphatic radical, for example a methylene, ethylene, propylene, isopropylene, n-butylene, isobutylene, t-butylene or cyclohexylene group. Cycloaliphatic radicals for the purposes of the present invention also comprehend bi-, tri- and polycyclic aliphatic radicals. r is an integer between 1 and 10, especially 1, 2, 3 and 4.

Preferred radicals of the formula (XIa) include:

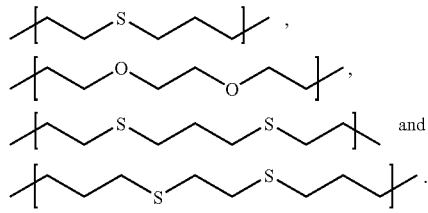

$R^{10}$ is preferably an aliphatic radical of 1 to 10 carbon atoms, preferably a linear aliphatic radical of 2 to 8 carbon atoms.

The radical Z represents oxygen or sulphur. Thus, the at least one compound of the general formula (XII) encompasses diols of the general formula (XIIa)

HO—$R^{11}$—OH (XIIa)

and hydroxy mercapto compounds of the general formula (XIIb).

HO—$R^{11}$—SH (XIIb)

The radical $R^{11}$ is a linear or branched aliphatic or cycloaliphatic radical or a substituted or unsubstituted aromatic or heteroaromatic radical, for example a methylene, ethylene, propylene, isopropylene, n-butylene, isobutylene, t-butylene or cyclohexylene group or divalent aromatic or heteroaromatic groups derived from benzene, naphthalene, biphenyl, diphenyl ether, diphenylmethane, diphenyldimethylmethane, bisphenone, diphenyl sulphone, quinoline, pyridine, anthracene and phenanthrene. Cycloaliphatic radicals for the purposes of the present invention also comprehend bi-, tri- and polycyclic aliphatic radicals.

The radical $R^{11}$ further comprehends radicals of the formula (XIIc)

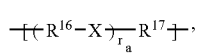 (XIIc)

where $R^{16}$ is independently at each instance a linear or branched, aliphatic or cycloaliphatic radical, for example a methylene, ethylene, propylene, isopropylene, n-butylene, isobutylene, t-butylene or cyclohexylene group. Each X is independently oxygen or sulphur and $R^{17}$ represents a linear or branched, aliphatic or cycloaliphatic radical, for example a methylene, ethylene, propylene, isopropylene, n-butylene, isobutylene, t-butylene or cyclohexylene group. Cycloaliphatic radicals for the purposes of the present invention also comprehend bi-, tri- and polycyclic aliphatic radicals. $r_a$ is an integer between 1 and 20, especially between 1 and 10.

Preferred radicals of the formula (XIIc) include:

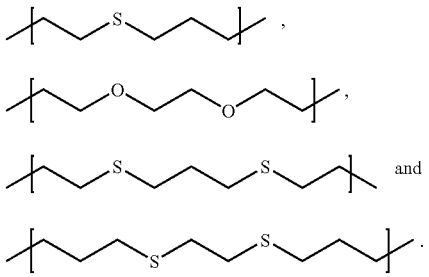

$v_H$ is is [sic] connected to $v_D$ via the relation $v_H=2-2*v_D$ and is thus a number in the range from 0.2 to 1.8, preferably in the range from 0.2 to 1.0, especially a number in the range from 0.8 to 1.0. According to the invention, it is very particularly preferred for $v_H$ to be 1.0.

Useful diisocyanates of the formula (X) include for example the following diisocyanates: aliphatic diisocyanates, such as hexamethylene diisocyanate, 2,2,4- and 2,4,4-trimethylhexamethylene diisocyanate, cycloaliphatic diisocyanates, such as isophorone diisocyanate, 1,4-cyclohexane diisocyanate, 1-methyl-2,4- and 2,6-cyclohexane diisocyanate, 4,4'-dicyclohexyl diisocyanate and also the corresponding position isomer mixtures, 4,4'-, 2,4'- and 2,2'-dicyclohexylmethane diisocyanate and also the corresponding position isomer mixtures, di-(2-isocyanatoethyl)-bicyclo[2.2.1]hept-5-ene2,3-dicarboxylate and aromatic diisocyanates, such as 2,4-toluylene diisocyanate, 2,6-toluene diisocyanate, mixtures of 2,4- and 2,6-toluylene diisocyanate, 4,4'-, 2,4'- and 2,2'-diphenylmethane diisocyanate, mixtures of 2,4'- and 4,4'-diphenylmethane diisocyanate, urethane-modified liquid 4,4'- and/or 2,4'-diphenylmethane diisocyanates, 4,4'-diisocyanato-1,2-diphenylethane, meta- and para-tetramethylxylene diisocyanate, 1,5-naphthalene diisocyanate and dianisidine diisocyanate. Preference is given to the use of 2,2,4- and 2,4,4-trimethylhexamethylene diisocyanate and mixtures thereof.

Useful dithiols include for example 1,2-ethanedithiol, 1,2-propanedithiol, 1,3-propanedithiol, 1,2-butanedithiol, 1,3-butanedithiol, 1,4-butanedithiol, 2-methylpropane-1,2-dithiol, 2-methylpropane-1,3-dithiol, 3,6-dioxa-1,8-octanedithiol, ethylcyclohexyl dimercaptans obtainable by reaction of 4-ethenylcyclohexene with hydrogen sulphide, ortho-bis(mercaptomethyl)benzene, meta-bis(mercaptoethyl)benzene, parabis(mercaptomethyl)benzene, compounds of the formula

-continued

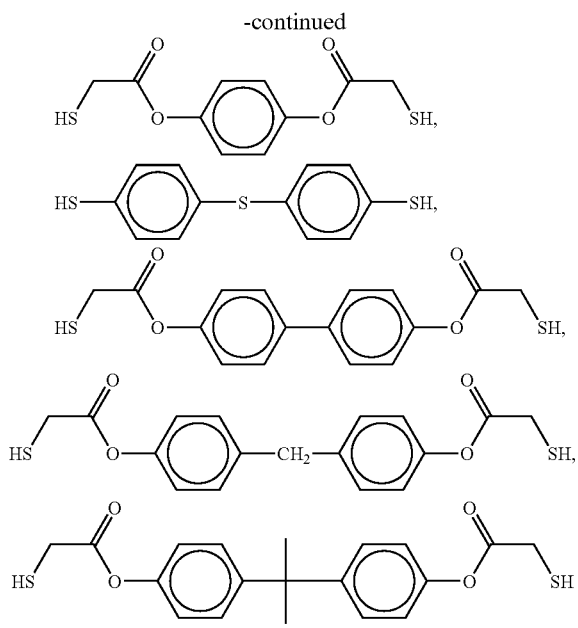

and also compounds of the formula

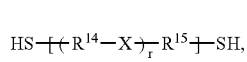 (XIb)

where each $R^{14}$ is independently a linear or branched, aliphatic or cycloaliphatic radical, for example a methylene, ethylene, propylene, isopropylene, n-butylene, isobutylene, t-butylene or cyclohexylene group. Cycloaliphatic radicals for the purposes of the present invention also comprehend bi-, tri- and polycyclic aliphatic radicals. The radical X is independently oxygen or sulphur and $R^{15}$ represents a linear or branched, aliphatic or cycloaliphatic radical, for example a methylene, ethylene, propylene, isopropylene, n-butylene, isobutylene, t-butylene or cyclohexylene group. Cycloaliphatic radicals for the purposes of the present invention also comprehend bi-, tri- and polycyclic aliphatic radicals. r is an integer between 1 and 10, especially 1, 2, 3 and 4.

Preferred compounds of the formula (XIb) include:

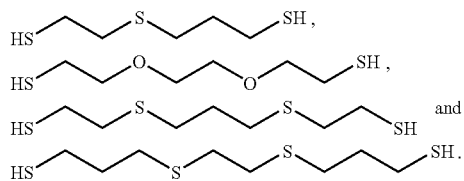

Suitable diols of the general formula (XIIa) include for example 1,2-ethanediol, 1,2-propanediol, 1,3-propanediol, 1,2-butanediol, 1,3-butanediol, 1,4-butanediol, 2-methyl-propane-1,2-diol, 2-methylpropane-1,3-diol, 3,6-dioxa-1,8-octanediol, orthobis(hydroxymethyl)benzene, meta-bis(hydroxymethyl)benzene, para-bis(hydroxymethyl)benzene, compounds of the formula

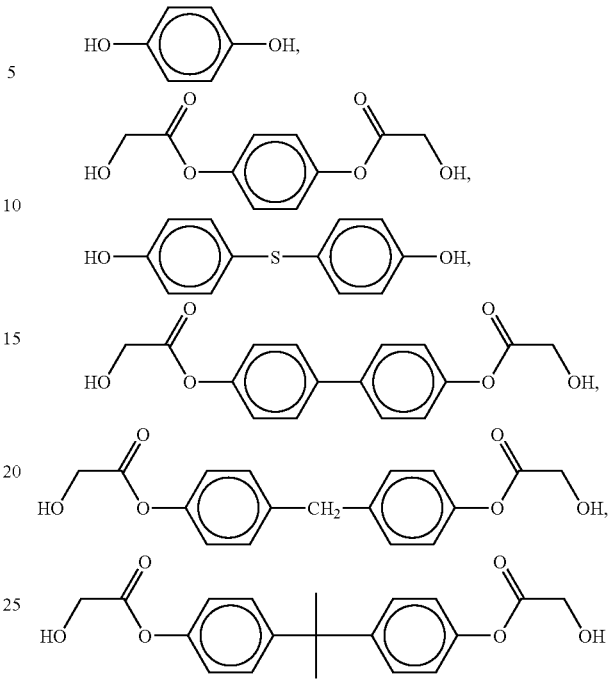

and also compounds of the formula

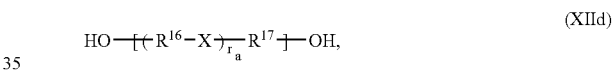 (XIId)

where $R^{16}$ is independently at each instance a linear or branched, aliphatic or cycloaliphatic radical, for example a methylene, ethylene, propylene, isopropylene, n-butylene, isobutylene, t-butylene or cyclohexylene group. Cycloaliphatic radicals for the purposes of the present invention also comprehend bi-, tri- and polycyclic radicals. The radical X is independently oxygen or sulphur and $R^{17}$ represents a linear or branched, aliphatic or cycloaliphatic radical, for example a methylene, ethylene, propylene, isopropylene, n-butylene, isobutylene, t-butylene or cyclohexylene group. Cycloaliphatic radicals for the purposes of the present invention also comprehend bi-, tri- and polycyclic aliphatic radicals. $r_a$ is an integer between 1 and 20, especially between 1 and 10.

Preferred compounds of the formula (XIId) include:

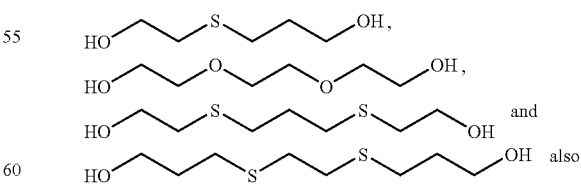

polyethylene glycols having a weight average molecular weight in the range from 100 to 1 000 g/mol, especially in the range from 100 to 500 g/mol.

Suitable hydroxy mercapto compounds of the general formula (XIIb) include for example 2-mercaptoethanol, 2-mercaptopropanol, 1-mercaptoisopropanol, 3-mercaptopropanol, 2-mercaptobutanol, 1-mercaptobutanol-(2), 3-mercaptobutanol, 1-mercaptobutanol-(3), 4-mercaptobutanol, 2-mercapto-2-methylpropanol, 1-mercapto-2-methylpropanol-(2), 3-mercapto-2-methylpropanol, 8-mercapto-3,6-dioxa-1,8-octanol, ortho-(mercaptomethyl)benzyl alcohol, meta-(mercaptomethyl)benzyl alcohol, para-(mercaptomethyl)benzyl alcohol, compounds of the formula

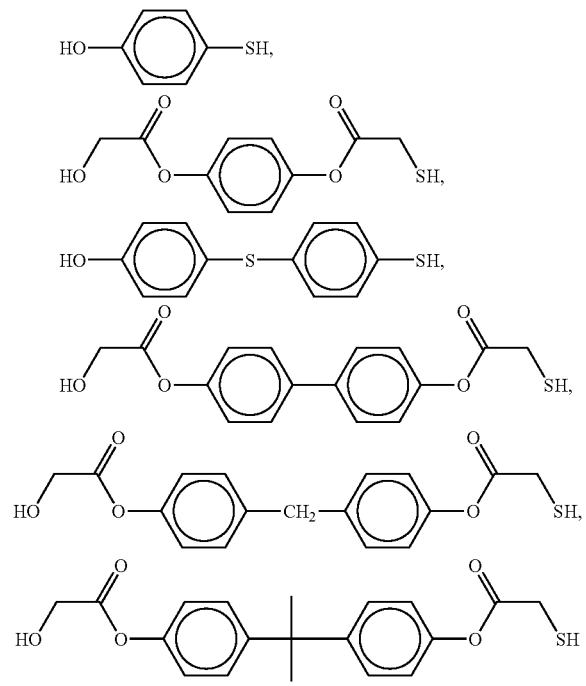

and also compounds of the formula

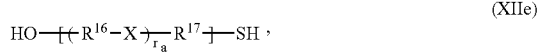

(XIIe)

where $R^{16}$ is independently at each instance a linear or branched, aliphatic or cycloaliphatic radical, for example a methylene, ethylene, propylene, isopropylene, n-butylene, isobutylene, t-butylene or cyclohexylene group. Cycloaliphatic radicals for the purposes of the present invention also comprehend bi-, tri- and polycyclic aliphatic radicals. The radical X is independently oxygen or sulphur and $R^{17}$ represents a linear or branched, aliphatic or cycloaliphatic radical, for example a methylene, ethylene, propylene, isopropylene, n-butylene, isobutylene, t-butylene or cyclohexylene group. Cycloaliphatic radicals for the purposes of the present invention also comprehend bi-, tri- and polycyclic aliphatic radicals. $r_a$ is an integer between 1 and 20, especially between 1 and 10.

Preferred compounds of the formula (XIIe) include:

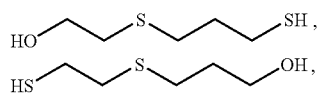

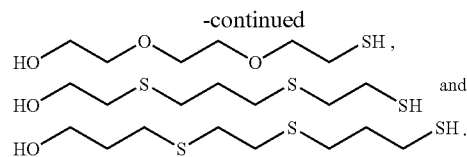

The reaction of the at least one isocyanate with the at least one thiol and the at least one compound of the general formula (XII) can be carried out in bulk, i.e., without use of a further solvent. If desired, an inert solvent can be used as well. Useful inert solvents include benzene, toluene, tetrahydrofuran, methyl isobutyl ketone (MIBK) and methyl ethyl ketone (MEK).

The reaction temperature can vary over a wide range, but frequently the temperature is in the range from 20.0° C. to 120.0° C., preferably in the range from 20.0° C. to 80.0° C. The same applies to the pressure at which the reaction is carried out. The reaction can take place not only under subatmospheric pressure but also under superatmospheric pressure. Preferably it is carried out at atmospheric pressure. The reaction can take place under air and also under protective gas atmosphere, in which case it is preferable for a small oxygen fraction to be present.

The reaction may often be speeded up using catalysts, for example tertiary amines, including triethylamine, 1,4-diazabicyclo[2.2.2]octane, N-methylmorpholine, N,N-diethylcyclohexylamine, N,N,N',N'-tetramethyldiaminomethane, N,N'-dimethylpiperazine, 2-(dimethylaminoethoxy)ethanol, pyridine, collidine and picoline, organic metal compounds such as titanate esters, iron compounds such as for example iron (III) acetylacetonate, tin compounds, for example tin diacetate, tin dioctoate, tin dilaurate or the tin dialkyl salts of aliphatic carboxylic acids such as dibutyltin diacetate, dibutyltin dilaurate or the like. These catalysts and also the amounts in which these compounds are used are well known to those skilled in the art and described for example in Ullmann's Encyclopedia of Industrial Chemistry, 5th edition, "polyurethanes".

It is particularly preferable according to the invention for the reaction of the isocyanate groups with the thiol groups and the hydroxyl groups to be conducted in the presence of a catalytically effective amount of a known urethane chemistry catalyst, especially pyridine, DABCO (diazabicyclo (2.2.2)octane), collidine and/or picoline.

The hydroxyalkyl (meth)acrylates useful for the reaction with the at least one α,ω-difunctional thiourethane compound from step a) are esters of (meth)acrylic acid with dihydric aliphatic alcohols. In this connection, the term hydroxyalkyl (meth)acrylate comprehends hydroxyalkyl methacrylates and hydroxyalkyl acrylates and also mixtures thereof. Hydroxyalkyl (meth)acrylates useful for the purposes of the invention satisfy the general formula (XIII)

$$CH_2=C(R^{12})-COO[CH(R^{13})]_q-CH_2-OH \quad (XIII).$$

Here $R^{12}$ is hydrogen or a methyl radical. $R^{13}$ is hydrogen or a linear or branched alkyl radical of 1 to 4 carbon atoms, for example a methyl, ethyl, propyl, isopropyl, n-butylene, isobutylene or a t-butyl radical. In the context of the present invention, $R^{13}$ is preferably hydrogen. According to the invention, q is 1, 2 or 3.

These compounds are well known to those skilled in the art. Many of them are obtainable for example by the reaction of (meth)acrylic acid with oxiranes. Useful oxirane compounds include ethylene oxide, propylene oxide, 1,2-buty-

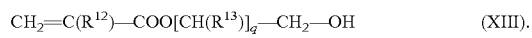

lene oxide and/or 2,3-butylene oxide. These compounds can be used not only individually but also as a mixture. The conversion to hydroxyalkyl (meth)acrylates is described for example in DE-A-24 39 352, DE-15 68 838 and GB 1 308 250.

The thus obtainable hydroxyalkyl (meth)acrylates are frequently commercially available and are therefore particularly suitable for the purposes of the invention.

Preferred hydroxylalkyl (meth)acrylates include 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 2-hydroxybutyl acrylate, 2-hydroxybutyl methacrylate, 3-hydroxybutyl acrylate, 3-hydroxybutyl methacrylate, 4-hydroxybutyl acrylate and 4-hydroxybutyl methacrylate, of which 2-hydroxyethyl methacrylate, 2-hydroxyethyl acrylate, 4-hydroxybutyl methacrylate and 4-hydroxybutyl acrylate are particularly preferred.

According to the invention, the reaction of the at least one α,ω-difunctional thiourethane compound from step a) with the at least one hydroxyalkyl (meth)acrylate of the general formula (XIII) is carried out in the presence of customary reaction-catalyzing and -stabilizing compounds.

The reaction can be carried out in bulk, i.e., without use of a further solvent. If desired, an inert solvent can be used as well. Useful inert solvents include benzene, toluene, tetrahydrofuran, methyl isobutyl ketone (MIBK) and methyl ethyl ketone (MEK).

The reaction of isocyanate groups with hydroxyl groups is well known among those skilled in the art. The reaction temperature can vary over a wide range, but frequently the temperature is in the range from 20.0° C. to 120.0° C., preferably in the range from 20.0° C. to 80.0° C. The same applies to the pressure at which the reaction is carried out. The reaction can take place not only under subatmospheric pressure but also under superatmospheric pressure. Preferably it is carried out at atmospheric pressure. The reaction can take place under air and also under protective gas atmosphere, in which case it is preferable for a small oxygen fraction to be present.

The reaction may often be speeded up using catalysts, for example tertiary amines, including triethylamine, 1,4-diazabicyclo[2.2.2]octane (DABCO), N-methylmorpholine, N,N-diethylcyclohexylamine, N,N,N',N'-tetramethyldiaminomethane, N,N'-dimethylpiperazine, 2-(dimethylaminoethoxy)ethanol, pyridine, collidine and picoline, organic metal compounds such as titanate esters, iron compounds such as for example iron (III) acetylacetonate, tin compounds, for example tin diacetate, tin dioctoate, tin dilaurate or the tin dialkyl salts of aliphatic carboxylic acids such as dibutyltin diacetate, dibutyltin dilaurate or the like. These catalysts and also the amounts in which these compounds are used are well known to those skilled in the art and described for example in Ullmann's Encyclopedia of Industrial Chemistry, 5th edition, "polyurethanes".

The reaction of the at least one α,ω-difunctional thiourethane compound from step a) with the at least one hydroxyalkyl (meth)acrylate of the general formula (XIII) may be carried out in the presence of inhibitors which prevent any free-radical polymerization of the (meth)acrylates during the reaction. Suitable inhibitors include the compounds mentioned above in connection with the compounds of the formula (I) and (II).

As well as catalysts and optionally inhibitors, the presence of further assistants and/or additives may be advantageous during the reaction of the at least one α,ω-difunctional thiourethane compound from step a) with the at least one hydroxyalkyl (meth)acrylate of the general formula (XIII). These include for example lubricants, stabilizers against hydrolysis, light, heat or discoloration and plasticizers.

Further particulars of the abovementioned assistant and additive materials are discernible from the technical literature, for example the monograph by J. H. Saunders and K. C. Frisch "High Polymers", volume XVI, Polyurethane, parts 1 and 2, Verlag Interscience Publishers 1962 and 1964 respectively or DE-A-29 01 774.

In a particularly preferred embodiment of the present invention, the thiourethane compound (T) is obtainable by reaction of one equivalent of at least one diisocyanate with $v_D$ equivalents of at least one dithiol (XI) or a mixture comprising at least one dithiol (XI) and at least one compound (XII) and subsequent reaction with $v_H$ equivalents of at least one hydroxyalkyl (meth)acrylate, using at least one mixture of two or more diisocyanates, two or more dithiols and/or two or more hydroxyalkyl (meth)acrylates.

The composition of the respective mixtures is in principle discretionary, i.e., it may also contain a distinct excess of one main component compared with the further constituents. A mixture containing 99.5 mol % of constituent A and 0.5 mol % of constituent B, each percentage being based on the number of moles of all the molecules in the mixture, would be an example of such a mixture. Other possibilities are equimolar mixtures of two or more constituents.

In the context of the present invention, mixtures of two to five, preferably two or three, especially two, constituents, are particularly useful. Preference is further given to mixtures where the mole fraction of a second and preferably of each component, based on the main component, is in the range from 0.2:1.0 to 1.0:1.0, advantageously in the range from 0.5:1.0 to 1.0:1.0 and especially in the range from 0.75:1.0 to 1.0:1.0. The main component is that component which is numerically present in excess compared with the other components. If two or more components come into consideration as a main component, the choice among the components in question is discretionary.

Although the approach of the present invention can lead to unitary thiourethane compounds (T) under suitable conditions, preference according to the present invention is given to mixtures of at least two, preferably two, three, four, five or six, thiourethane compounds (T).

In the context of a particularly preferred embodiment of the present invention, the at least one thiourethane compound (T) is obtainable by reaction of one equivalent of a diisocyanate of the general formula (X) with $v_D$ equivalents of a dithiol of the general formula (XI) or a mixture consisting of a dithiol of the general formula (XI) and at least one compound of the general formula (XII) and the subsequent reaction with $v_H$ equivalents of a mixture of at least two hydroxyalkyl (meth)acrylates of the general formula (XIII). Preference is given to a mixture of at least two thiourethane compounds (T) which advantageously differ in $R^{12}$, $R^{13}$ and/or q. The use of mixtures of 2-hydroxyethyl methacrylate and 4-hydroxybutyl acrylate is very particularly advantageous in this context.

In a further particularly preferred embodiment of the present invention, the at least one thiourethane compound (T) is obtainable by reaction of one equivalent of a diisocyanate of the general formula (X) with $v_D$ equivalents of a mixture of at least two dithiols of the general formula (XI) and optionally at least one compound of the general formula (XII) and also the subsequent reaction with $v_H$ equivalents of a hydroxyalkyl (meth)acrylate of the general formula (XIII).

Preference is given to a mixture of at least two thiourethane compounds (T) which advantageously differ in $R^{10}$.

The use of mixtures of 3,6-dioxa-1,8-octanedithiol and 1,2-ethanedithiol or of a product mixture obtainable by reaction of 4-ethenylcyclohexene with hydrogen sulphide, especially the use of mixtures of 3,6-dioxa-1,8-octanedithiol and 1,2-ethanedithiol as dithiol (II), is very particularly useful in this context.

In a third preferred embodiment of the present invention, the at least one thiourethane compound (T) is obtainable by reaction of one equivalent of a mixture of at least two diisocyanates of the general formula (I) with $v_D$ equivalents of a dithiol of the general formula (XI) or of a mixture consisting of a dithiol of the general formula (XI) and at least one compound of the general formula (XII) and also the subsequent reaction with $v_H$ equivalents of a hydroxyalkyl (meth)acrylate of the general formula (XIII). Preference is given to a mixture of at least two thiourethane compounds (T) which advantageously differ in $R^9$. The use of mixtures of a position isomer mixture of 2,2,4- and 2,4,4-trimethyl-hexamethylene diisocyanate (CAS-34992-02-4), and isophorone diisocyanate (obtainable by reaction of 1-amino-3-aminomethyl-3,5,5-trimethylcyclohexane with phosgene) is very particularly useful in this context.

Alternative ways to prepare the thiourethane compound (T) are evident to one skilled in the art. For example, it may also be obtained by reaction of one equivalent of at least one diisocyanate (X) with $v_H$ equivalents of at least one hydroxyalkyl (meth)acrylate (XIII) and subsequent coupling with $v_D$ equivalents of a dithiol of the general formula (XI) or of a mixture comprising at least one dithiol (XI) and at least one compound (XII).

Also conceivable is the mixing of two or more monomers which are each independently obtainable by reaction of one equivalent of at least one diisocyanate (X) with $v_D$ equivalents of a dithiol (XI) or of a mixture comprising at least one dithiol (XI) and at least one compound (XII) and subsequent reaction of the at least one α,ω-difunctional thiourethane compound from step a) with $v_H$ equivalents of at least one hydroxyalkyl (meth)acrylate (XIII).

In the context of a particularly preferred embodiment of the present invention, the mixture according to the present invention, in addition to the thiourethane compound (T) contains an ethylenically unsaturated monomer (B) which differs from the thiourethane compound (T), as a monomer (A). Particularly useful monomers (B) are (meth)acrylates of the formula (XIV)

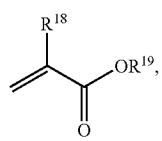

(XIV)

di(meth)acrylates of the formula (XV)

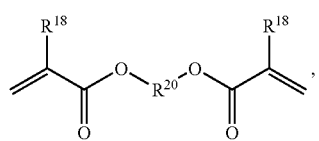

(XV)

and styrenes. Here $R^{18}$ is independently at each instance hydrogen or methyl. $R^{19}$ characterizes a linear or branched alkyl or cycloalkyl radical or an aromatic radical having 1 to 40, preferably 1 to 20, advantageously 1 to 8, and especially 1 to 6 carbon atoms, such as for example a methyl, ethyl, propyl, isopropyl, n-butyl, isobutyl, t-butyl, cyclopentyl, cyclohexyl or phenyl group. Cycloaliphatic radicals for the purposes of the present invention also comprehend bi-, tri- and polycyclic aliphatic radicals. Linear or branched alkyl or cycloalkyl radicals having 1 to 6 carbon atoms are most preferred as $R^{19}$.

The radical $R^{20}$ is a linear or branched, aliphatic or cycloaliphatic radical, such as for example a methylene, ethylene, propylene, isopropylene, n-butylene, isobutylene, t-butylene or cyclohexylene group or a radical of the general formula

(XVa)

where the radical $R^{22}$ represents a linear or branched, aliphatic or cycloaliphatic radical or a substituted or unsubstituted aromatic or heteroaromatic radical, such as for example a methylene, ethylene, propylene, isopropylene, n-butylene, isobutylene, t-butylene or cyclohexylene group or divalent aromatic or heteroaromatic groups which are derived from benzene, naphthalene, biphenyl, diphenyl ether, diphenylmethane, diphenyldimethylmethane, bisphenone, diphenyl sulphone, quinoline, pyridine, anthracene and phenanthrene. Cycloaliphatic radicals for the purposes of the present invention also comprehend bi-, tri- and polycyclic aliphatic radicals. The radical $R^{21}$ is independently at each instance a linear or branched, aliphatic or cycloaliphatic radical or a substituted or unsubstituted aromatic or heteroaromatic radical, such as for example a methylene, ethylene, propylene, isopropylene, n-butylene, isobutylene, t-butylene or cyclohexylene group or divalent aromatic or heteroaromatic groups which are derived from benzene, naphthalene, biphenyl, diphenyl ether, diphenylmethane, diphenyldimethylmethane, bisphenone, diphenyl sulphone, quinoline, pyridine, anthracene and phenanthrene. Cycloaliphatic radicals for the purposes of the present invention also comprehend bi-, tri- and polycyclic aliphatic radicals is [sic].

The radical $X^1$ is independently at each instance oxygen or sulphur, an ester group of the general formula (XCb), (XVb)

(XVb)

(XVc)

a urethane group of the general formula (XVd), (XVe), (XVf) or (XVg)

(XVd)

(XVe)
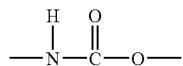

(XVf)
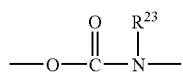

(XVg)
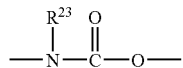

a thiourethane group of the general formula (XVh), (XVi), (XVj) or (XVk)

(XVh)
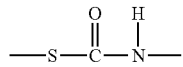

(XVi)
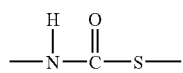

(XVj)
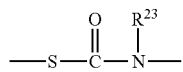

(XVk)
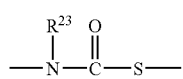

a dithiourethane group of the general formula (XVl), (XVm), (XVn) or (XVo)

(XVl)
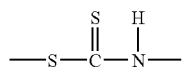

(XVm)
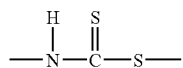

(XVn)

(XVo)
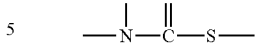

or a thiocarbamate group of the general formula (XVp), (XVq), (XVr) or (XVs)

(XVp)
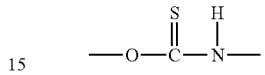

(XVq)
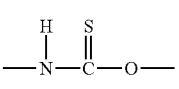

(XVr)
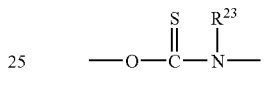

(XVs)
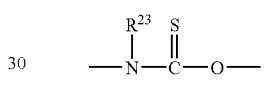

preferably oxygen, the radical $R^{23}$ being a linear or branched, aliphatic or cycloaliphatic radical or a substituted or unsubstituted aromatic or heteroaromatic radical, such as for example a methyl, ethyl, propyl, isopropyl, n-butyl, isobutyl, t-butyl or cyclohexyl group, or monovalent aromatic or heteroaromatic groups which are derived from benzene, naphthalene, biphenyl, diphenyl ether, diphenylmethane, diphenyldimethylmethane, bisphenone, diphenyl sulphone, quinoline, pyridine, anthracene and phenanthrene.

Cycloaliphatic radicals for the purposes of the present invention also comprehend bi-, tri- and polycyclic aliphatic radicals. z is an integer between 1 and 1 000, advantageously between 1 and 100, especially between 1 and 25.

Monomers (B) which are very particularly preferred according to the present invention include (meth)acrylates of the formula (XIV) and also di(meth)acrylates of the formula (XV), especially di(meth)acrylates of the formula (XV). Particularly preferred (meth)acrylates of the formula (XIV) include methyl (meth)acrylate and cyclohexyl (meth)acrylate, especially methacrylates of the compounds mentioned. Particularly preferred di(meth)acrylates of the formula (XV) include ethylene glycol di(meth)acrylate, ethoxylated bisphenol A di(meth)acrylate, especially

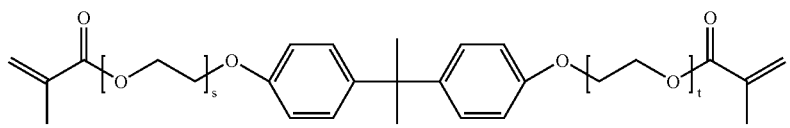

where s and t are not less than zero and the sum total s+t is preferably in the range from 1 to 20 and especially in the range from 2 to 10, and di(meth)acrylates obtainable by reaction of diisocyanates with 2 equivalents of hydroxyalkyl (meth)acrylate, especially

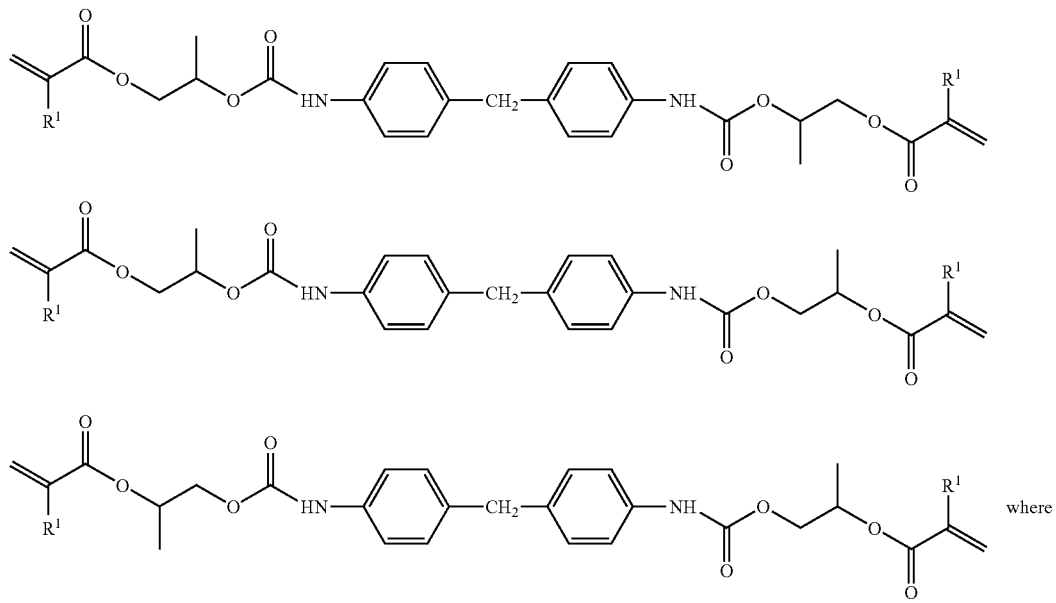

where the radical $R^1$ is independently at each instance hydrogen or a methyl radical, 3,8-di(meth)acryloyloxymethyltricyclo [5.2.1.0(2.6)]decane, 3,9-di(meth)-acryloyloxymethyltricyclo[5.2.1.0(2.6)]decane, 4,8-di-(meth)acryloyloxymethyltricyclo[5.2.1.0(2.6)]decane, 4,9-di(meth)acryloyloxymethyltricyclo[5.2.1.0(2.6)]decane, thiodiglycol di(meth)acrylate, polypropylene glycol di(meth)acrylate, preferably having a number average molecular weight in the range from 200 to 1 000 g/mol, and/or polyethylene glycol di(meth)acrylate, preferably having a weight average molecular weight in the range from 200 to 1 000 g/mol. Dimethacrylates of the compounds mentioned are particularly preferred. Very particularly advantageous results are obtained using polyethylene glycol dimethacrylate, preferably having a weight average molecular weight in the range from 200 to 1 000 g/mol.

In particularly preferred embodiments of the mixtures according to the present invention, at least 70.0 weight percent of the ethylenically unsaturated monomers (A), particularly preferably more than 80.0% by weight, advantageously 90.0% by weight and especially 95.0% by weight of the ethylenically unsaturated monomers, based on the total weight of the ethylenically unsaturated monomers (A), are (meth)acrylates of the formula (XIV), di(meth)acrylates of the formula (XV) and/or styrene.

The composition of the monomer mixtures according to the present invention in so far as they are used in the context of the invention is in principle discretionary, it can be utilized to tailor the performance profile of the plastic according to the present invention according to the requirements of the application. For example, it can be extremely advantageous for the monomer mixture to contain a distinct excess of compounds of the formula (I) and (II) or of monomer (A). A mixture containing 99.5 mol % of compounds of the formula (I) and (II) or monomer (A) and 0.5 mol % of monomer (A) or compounds of the formula (I) and (II), each based on the sum total of the moles of the compounds of the formula (I) and (II) and also monomer (A) in the mixture, would be an example of such a mixture. Also possible are substantially equimolar mixtures of the compounds of the formula (I) and (II) and also of monomer (A).

However, it has been determined to be particularly advantageous to choose the composition of the monomer mixture such that the compound or compounds of the formula (I) and (II) and the at least one monomer (A) form a homogeneous mixture at the desired polymerization temperature, since such mixtures are easily handlable owing to their generally low viscosity and, what is more, can be polymerized to form homogeneous plastics having improved material properties.

In a particularly preferred embodiment of the present invention, the monomer mixture contains at least 5.0% by weight and, preferably at least 20.0% by weight, more preferably at least 50.0% by weight, advantageously at least 60.0% by weight and especially at least 80.0% by weight of compounds of the formula (I) and (II), each percentage being based on the total weight of the monomer mixture. The weight fraction of monomer (A) is preferably at least 5.0% by weight, preferably at least 20.0% by weight, more preferably at least 40.0% by weight, advantageously at least 50.0% by weight and especially at least 80.0% by weight, each percentage being based on the total weight of the monomer mixture.

The way to prepare the monomer mixture to be used according to the present invention is obvious to one skilled in the art. It can be prepared for example by mixing the two monomers (A) and (B) in a conventional manner.

For the purposes of the present invention, the monomer mixture is preferably flowable at standard pressure and temperatures in the range from 20.0° C. to 80.0° C. The term "flowable" is familiar to one skilled in the art. It characterizes a more or less viscous liquid which is preferably castable into various shapes and stirrable and homogenizable using suitable assistants. Particular flowable compositions for the purposes of the invention have in particular at 25° C. and standard pressure (101 325 Pa) dynamic viscosities of the order of 0.1 mPa.s to 10 Pa.s and advantageously in the range from 0.65 mPa.s to 1 Pa.s. In a particularly preferred embodiment of the present invention, a cast monomer mixture is free of bubbles, especially air bubbles. Preference is likewise given to monomer mixtures from which bubbles, especially air bubbles, are removable by suitable methods, for example temperature elevation and/or application of vacuum.

The highly transparent plastic of the present invention is obtainable by free-radical copolymerization of the monomer mixture described above. Free-radical copolymerization is a well-known process initiated by free radicals for converting a mixture of low molecular weight monomers into high molecular weight compounds, so-called polymers. For further details see the disclosure of H. G. Elias, Makromoleküle, volumes 1 and 2, Basle, Heidelberg, New York Hüthig und Wepf. 1990 and Ullmann's Encyclopedia of Industrial Chemistry, 5th edition, "polymerization processes".

In a preferred embodiment of the present invention, the plastic of the invention is obtainable by mass or bulk polymerization of the monomer mixture. A mass or bulk polymerization is a polymerization process in which monomers are polymerized without solvent, so that the polymerization reaction proceeds in the mass or bulk. This is in contrast to the polymerization in emulsion (so-called emulsion polymerization) and the polymerization in dispersion (so-called suspension polymerization), where the organic monomers are suspended in an aqueous phase using protective colloids and/or stabilizers and more or less coarse polymer particles are formed. A particular form of the polymerization in heterogeneous phase is bead polymerization, which is essentially a suspension polymerization.

The polymerization reaction can in principle be initiated in any manner familiar to one skilled in the art, for example using a radical initiator (for example peroxide, azo compound) or by irradiation with UV rays, visible light, α-rays, β-rays or γ-rays or a combination thereof.

In a preferred embodiment of the present invention, the polymerization is initiated using lipophilic radical polymerization initiators. The radical polymerization initiators are lipophilic especially so that they may dissolve in the mixture of the substance polymerization. Useful compounds include not only the classic azo initiators, such as azoisobutyronitrile (AIBN) or 1,1-azobiscyclohexanecarbonitrile, but also aliphatic peroxy compounds, for example tert-amyl peroxyneodecanoate, tert-amyl peroxypivalate, tert-butyl peroxypivalate, tert-amyl peroxy-2-ethylhexanoate, tert-butyl peroxy-2-ethylhexanoate, tert-amyl peroxy-3,5,5-trimethylhexanoate, ethyl 3,3-di(tert-amylperoxy)butyrates, tert-butyl perbenzoate, tert-butyl hydroperoxide, decanoyl peroxide, lauryl peroxide, benzoyl peroxide and any mixtures of the compounds mentioned. Of the aforementioned compounds, AIBN is very particularly preferred.

In a further preferred embodiment of the present invention, the polymerization is initiated using known photoinitiators by irradiation with UV rays or the like. Useful compounds include the widely used and commercially available compounds such as for example benzophenone, α,α-diethoxyacetophenone, 4,4-diethylaminobenzophenone, 2,2-dimethoxy-2-phenylacetophenone, 4-isopropylphenyl 2-hydroxy-2-propyl ketone, 1-hydroxycyclohexyl phenyl ketone, isoamyl p-dimethylaminobenzoate, methyl 4-dimethylaminobenzoate, methyl o-benzoylbenzoate, benzoin, benzoin ethyl ether, benzoin isopropyl ether, benzoin isobutyl ether, 2-hydroxy-2-methyl-1-phenylpropan-1-one, 2-isopropylthioxanthone, dibenzosuberone, 2,4,6-trimethylbenzoyldiphenylphosphine oxide, bisacylphosphine oxide and others, and the photoinitiators mentioned may be used alone or in combination of two or more or in combination with one of the above polymerization initiators.

The amount of radical former can vary within wide limits. Preference is given to using for example amounts in the range from 0.1 to 5.0% by weight, based on the weight of the total composition. Particular preference is given to amounts in the range from 0.1 to 2.0% by weight, especially amounts in the range from 0.1 to 0.5% by weight, each percentage being based on the weight of the total composition.

The polymerization temperature to be chosen for the polymerization is evident to one skilled in the art. It is primarily determined by the choice of initiator and by the method of initiation (thermally, by irradiation and so on). It is known that the polymerization temperature can influence the product properties of a polymer. For this reason, the preference of the present invention is for polymerization temperatures in the range from 20.0° C. to 100.0° C., advantageously in the range from 20.0° C. to 80.0° C. and especially in the range from 20.0° C. to 60.0° C. In a particularly preferred embodiment of the present invention, the reaction temperature is raised during the reaction, preferably in stages. It will further be advantageous to carry out a heat treatment at elevated temperature, for example at 100° C. to 150° C., towards the end of the reaction.

The reaction can take place not only at subatmospheric pressure but also at superatmospheric pressure. But preferably it is conducted at atmospheric pressure. The reaction can take place under air and also under protective gas atmosphere, in which case it is preferable for a small fraction of oxygen to be present, since it inhibits a possible polymerization.

In a particularly preferred embodiment of the present invention, the highly transparent plastic of the invention is prepared by preparing a homogeneous mixture of the monomer mixture, initiator and further additives, for example lubricants, and subsequently placing this homogeneous mixture between glass plates whose shape is predetermined by the later application, for example as lenses, spectacle glasses, prisms or other optical components. The substance polymerization is initiated by energy supply, for example by high energy radiation, especially using UV light, or by heating, conveniently in a waterbath for several hours. This provides the optical material in its desired shape as a clear, transparent, colourless, rigid plastic.

For the purposes of the present invention, lubricants are additives for filled plastically deformable compositions, such as compression moulding compounds and injection moulding compounds, to lubricate the fillers and make the compression moulding compounds consequently more easily mouldable. These include for example metal soaps and siloxane combinations. Owing to its insolubility in plastics, a portion of the lubricant migrates to the surface in the course of processing and acts as a release agent. Particularly suitable lubricants, such as nonionic fluorosurfactants, nonionic silicone surfactants, quaternary alkylammonium salts and acidic phosphate esters, are described in EP 271839 A, the disclosure of which is explicitly incorporated herein by reference.

The present invention provides a highly transparent plastic having very good optical and mechanical properties. For instance, its DIN 5036 transmission is preferably above 88.5%, advantageously above 89.0%, preferably above 89.5% and especially above 90.0%.

The refractive index $n_D$ of the plastic of the present invention is preferably above 1.6. The refractive index $n_D$ is a variable which is known to one skilled in the art and which, according to the invention, characterizes the deflection (change of direction) which a ray of light suffers on passing at an angle from an optically different medium, for example air, into the highly transparent plastic of the invention, in which its speed of propagation (c=velocity of light in the vacuum, c/n=velocity of light in the medium having refractive index n) differs. Snell first formulated his law of refraction in 1615:

$$\frac{\sin\alpha}{\sin\beta} = \frac{n_2}{n_1}$$

Here $n_1$ and $n_2$ are the refractive indices of the two media 1 and 2 respectively, $\alpha$ is the angle of incidence in medium 1 and $\beta$ is the angle of incidence in medium 2.

The refractive index of a medium generally depends on the wavelength of the incident radiation and on the temperature. The refractive index data of the invention are therefore based on the standards specified in DIN 53491 (standard wavelength of the (yellow) D line of sodium (about 589 nm)).

According to the present invention, the plastic has a DIN 53491 Abbe number >36.0 and especially >37.0. The Abbe number goes back to E. Abbe and refers to variable $v_D$ $$v_D = \frac{(n_D - 1)}{(n_F - n_C)}$$

being introduced to characterize the dispersive power of an optical medium. $n_D$, $n_F$ and $n_C$ are the refractive indices of the medium at the Fraunhofer D, F and C lines respectively. D is the average value of the sodium D lines $\lambda_1$=589.6 nm and $\lambda_2$=589.0 nm, F is the hydrogen line at $\lambda$=486.1 nm and C is the hydrogen line at $\lambda$=656.3 nm. A large Abbe number denotes low dispersion. Further information concerning the Abbe number is available to the skilled person from the literature, for example Lexikon der Physik (Walter Greulich (editor); Lexikon der Physik; Heidelberg; Spektrum, Akademischer Verlag; volume 1; 1998).

In a particularly preferred embodiment of the present invention, the plastic has an Abbe number >38.0, advantageously >39.0, especially >40.0. Plastics having an Abbe number >41.0 and preferably >42.0 have been found to be very particularly advantageous. According to the invention, plastics having an Abbe number >43.0 and especially >44.0 are of the greatest interest.

The IS 179/1fU Charpy impact toughness of the plastic according to the present invention is preferably greater than 3.0 kJ/m².

The plastic of the invention is further notable for a high ISO 306 Vicat temperature, so that it retains its excellent mechanical properties, especially its Charpy impact toughness and its hardness, at temperatures above room temperature. The ISO 306 Vicat temperature of the plastic according to the invention is preferably greater than 50° C., advantageously greater than 60° C. and especially greater than 70° C. ISO 306 Vicat temperatures greater than 80° C. and preferably greater than 90° C., advantageously greater than 100° C. and especially greater than 120° C. are very particularly advantageous for the plastic according to the invention. In a very particularly preferred embodiment of the present invention, the plastic has an ISO 306 Vicat temperature of greater than 140° C., preferably greater than 160° C. and especially greater than 180° C.

The plastic according to the present invention has a tangent delta maximum (measured by ISO 6721-7 torsion vibration measurement for the purposes of the present invention) of preferably more than 50, advantageously more than 60.

Possible areas of use for the highly transparent plastic of the invention are evident to one skilled in the art. The highly transparent plastic of the invention is especially useful for all applications marked out for transparent plastics. Owing to its characteristic properties, the highly transparent plastic of the invention is particularly useful for optical lenses, especially for ophthalmic lenses.

The inventive examples hereinbelow and the comparative example serve to illustrate the invention without limiting it. The properties of the polymers obtained are summarized in Table 1.

Synthesis of Thiomethacrylate Mixture 75.36 g of 1,2-ethanedithiol are weighed into a conical flask having a protective gas inlet and stirred and 416.43 g of 13% NaOH solution are added at 25–30° C. with water cooling over 30 minutes. A clear brownish solution forms.

178.64 g of methacrylic anhydride and the sodium thiolate solution are then added concurrently to the initially charged and stirred ethyl acetate/water in the reaction flask at the desired metering temperature in the course of 45 minutes. In the process, protective gas is passed over the batch, if necessary. Generally, the flask contents cool down by about 2° C. at the start of the addition, and a slightly exothermic reaction starts after about 5–10 minutes, i.e. cooling is then applied at a rate appropriate to maintain the desired reaction temperature (35° C.). On completion of the addition, the batch is stirred at 35° C. for a further 5 minutes and then cooled down to about 25° C. with stirring.

The batch is transferred into a separating funnel, separated and the lower, aqueous phase is drained off. To work up the organic phase, it is transferred into a conical flask and stirred with Dowex M31 for about 15 minutes, and the ion exchanger is then filtered off.

The somewhat turbid to almost clear crude ester solution is then stabilized with 100 ppm of HQME and concentrated at max. 50° C. in a rotary evaporator. The colourless end product is if appropriate admixed with 0.5% of diatomaceous earth at room temperature (20–25° C.) and stirred for about 10 minutes. This is followed by filtering through a Seitz K800 filter layer and a 0.45 µm filter membrane at about 1 bar. About 140 g of colourlessly clear ester are obtained.

INVENTIVE EXAMPLE 2 mol equivalents of TMDI (position isomer mixture of 2,2,4- and 2,4,4-trimethylhexamethylene diisocyanate (CAS-34992-02-4)) are weighed into a flask together with 0.01 to 0.5% by weight of DABCO in 81 g of thiomethacrylate and mixed to form a homogeneous solution.

1 mol equivalent of 3,6-dioxa-1,8-octanedithiol is then added at about 60–80° C. over one hour, which is followed by stirring at about 60–80° C. for one hour. This reaction stage is also possible without catalyst, if desired.

Subsequently, 2 mol equivalents of 2-hydroxyethyl methacrylate, stabilizer (0.1% by weight of 4-methyl-2,6-di-tert-butylphenol) are added before a further 0.01 to 0.5% by weight of the abovementioned amine or of an Sn compound, such as dibutyltin laurate for example is added. The mixture is stirred at about 60–80° C. for 1 to 5 hours.

The viscous casting resin is then poured into a mould and polymerized using 0.2% by weight of AIBN.

Comparative Example

Example V-1 of DE 42 34 251 was repeated for comparison.

TABLE 1

Properties of polymers obtained

| No. | Refractive index[1] | Abbe number[2] | Impact toughness[3] [kJ/m$^2$] | T (tan delta max.)[4] [T/° C.] | Vicat[5] [T/° C.] | Transmission[6] [T %] |
|---|---|---|---|---|---|---|
| comp 1 | 1.610 | 36.9 | 2.05 | 70.4 | >140 | 87.6 |
| inv 1 | 1.6069 | 37.2 | 3.85 | 63.8 | >180 | 88.9 |

[1]determination of refractive index as per DIN 53491 at λ = 589 nm
[2]determination of Abbe number as per DIN 53491
[3]determination of Charpy impact toughness as per ISO 179/1 fU
[4]determination of tan delta max. as per ISO 6721-7
[5]determination of Vicat temperature as per ISO 306
[6]determination of transmission as per DIN 5036

The invention claimed is:

1. A composition comprising a mixture of:
A) compounds of the formulas (I) and (II):

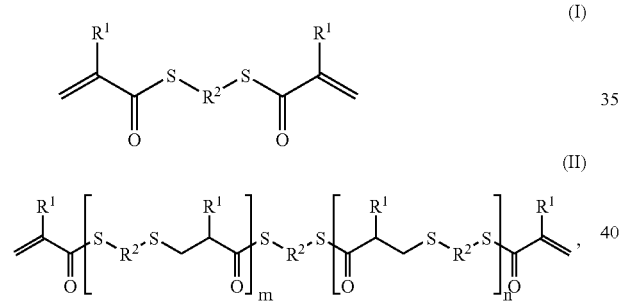

wherein
$R^1$ independently at each instance hydrogen or a methyl radical,
$R^2$ is independently at each instance at least one selected from the group consisting of a linear aliphatic radical, a branched aliphatic radical, a cycloaliphatic radical, an aromatic radical and a heteroaromatic radical, and
m and n are each independently an integer of not less than 0, subject to the proviso that m+n>0;
B) at least one ethylenically unsaturated monomer (A) which is different from said compounds of said formulas (I) and (II); and
C) at least one thiourethane compound (T), said compound (T) obtained by:
a) the reaction of one equivalent of at least one diisocyanate of the formula (X):

wherein
$R^9$ is at least one selected from the group consisting of a linear aliphatic radical, a branched aliphatic radical, a cycloaliphatic radical, an aromatic radical and a heteroaromatic radical, with $v_D$ equivalents of a dithiol of the formula (XI):

wherein
$v_D$ is from 0.1 to 0.9,
$R^{10}$ is at least one selected from the group consisting of a linear aliphatic radical, a branched aliphatic radical, a cycloaliphatic radical, an aromatic radical and a heteroaromatic radical, or
$v_D$ equivalents of a composition comprising at least one dithiol of said formula (XI) and at least one compound of said formula (XII):

wherein
$R^{11}$ is at least one selected from the group consisting of a linear aliphatic radical, a branched aliphatic radical, a cycloaliphatic radical, an aromatic radical and a heteroaromatic radical,
Z is oxygen or sulphur,
in the presence of a catalytically effective amount of a urethane catalyst; and
b) the reaction, in the presence of reaction-catalyzing and stabilizing compounds, of at least one α,ω-difunctional thiourethane compound of step a)
with
$v_H$ equivalents of at least one hydroalkyl (meth)acrylate of the formula (XIII):

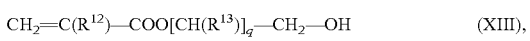

wherein
$v_H=2-2* v_D$,
$R^{12}$ is hydrogen or a methyl radical,
$R^{13}$ is hydrogen or a linear or branched alkyl radical having 1 to 4 carbon atoms, and
Q is a positive integer from 1 to 3.

2. The composition according to claim 1, wherein said radical urethane catalyst is at least one compound selected from the group consisting of pyridine, diazobicyclo(2.2.2)octane, collidine and picoline.

3. The composition according to claim 1, wherein said radical $R^{13}$ is hydrogen.

4. The composition according to claim 1, wherein said at least one hydroxyalkyl (meth)acrylate of said formula (XIII) is selected from the group consisting of 2-hydroxyethyl methacrylate, 2-hydroxyethyl acrylate, 4-hydroxybutyl methacrylate and 4-hydroxybutyl acrylate.

5. The composition according to claim 1, wherein said radical $R^9$ is an aliphatic radical having 2 to 9 carbon atoms.

6. The composition according to claim 1, wherein said radical $R^{10}$ is an aliphatic radical having 1 to 10 carbon atoms.

7. The composition according to claim 6, wherein said radical $R^{10}$ is a linear aliphatic radical having 2 to 8 carbon atoms.

8. The composition according to claim 1, further comprising at least one ethylenically unsaturated monomer (B), which is different from the thiourethane compound (T), as a monomer (A).

9. The composition according to claim 8, wherein said at least one ethylenically unsaturated monomer (B) is a (meth)acrylate of the formula (XIV):

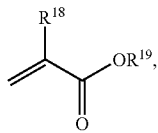 (XIV)

wherein
R$^{18}$ is hydrogen or methyl, and
R$^{19}$ is a linear or branched alkyl or cycloalkyl radical or an aromatic radical having 1 to 40 carbon atoms;
a di(meth)acrylate of the formula (XV):

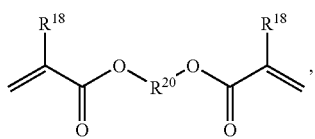 (XV)

wherein
R$^{18}$ is independently at each instance hydrogen or methyl, and
R$^{20}$ is a linear or branched, aliphatic or cycloaliphatic radical or a radical of the formula (XVa):

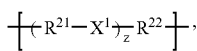 (XVa)

wherein
R$^{22}$ is a linear or branched, aliphatic or cycloaliphatic radical,
z is an integer between 1 and 1000,
R$^{21}$ is independently at each instance a linear or branched, aliphatic or cycloaliphatic radical, and
X$^{1}$ is independently at each instance hydrogen or sulphur, an ester group of the formula (XVb) or (XVc):

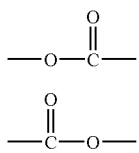 (XVb)

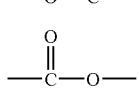 (XVc)

a urethane group of the formula (XVd), (XVe), (XVf) or (XVg):

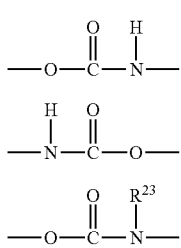 (XVd)

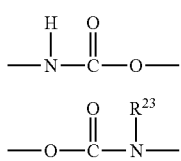 (XVe)

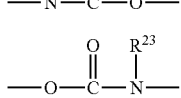 (XVf)

(XVg)

a thiourethane group of the formula (XVh), (XVi), (XVj) or (XVk):

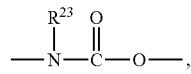 (XVh)

(XVi)

(XVj)

(XVk)

a dithiourethane group of the formula (XVl), (XVm), (XVn) or (XVo):

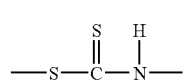 (XVl)

(XVm)

(XVn)

(XVo)

or a thiocarbamate group of the formula (XVp), (XVq), (XVr) or (XVs):

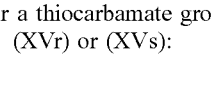 (XVp)

(XVq)

(XVr)

(XVs)

wherein R$^{23}$ is a linear or branched, aliphatic or cycloaliphatic radical, and/or styrene.

10. The composition according to claim 9, wherein said monomer (B) is a di(meth)acrylate of said formula (XV).

11. A process for producing a transparent plastic, comprising polymerizing the composition according to claim 1.

12. A highly transparent plastic obtained by the process according to claim 11.

13. A highly transparent plastic according to claim 12, wherein said transparent plastic has a DIN 53491 refractive index is greater than 1.6.

14. A highly transparent plastic according to claim 12, wherein said transparent plastic has a DIN 53491 Abbe number greater than 36.

15. A highly transparent plastic according to claim 12, wherein said transparent plastic has an ISO 179/1fU Charpy impact toughness greater than 3.0 kJ/m².

16. A highly transparent plastic according to claim 12, wherein said transparent plastic has a DIN 5036 transmission greater than 88.5%.

17. A highly transparent plastic according to claim 12, wherein said transparent plastic has an ISO 306 Vicat temperature greater than 50.0° C.

18. An optical lens comprising the transparent plastic according to claim 12.

19. An optical lens according to claim 18, wherein said optical lens is an ophthalmic lens.

20. The composition according to claim 1, wherein m and n are each independently an integer selected from the group consisting of 1, 2, 3, 4, 5 and 6.

21. The composition according to claim 1, wherein each of m and n are each independently selected from the group consisting of 2, 3, 4, 5 and 6.

22. The composition according to claim 1, wherein m and n are each independently selected from the group consisting of 3, 4, 5 and 6.

23. The composition according to claim 1, wherein m and n are each independently selected from the group consisting of 4, 5 and 6.

24. The composition according to claim 1, wherein $R^2$ is independently a divalent aromatic or heteroaromatic group derived from at least one selected from the group consisting of benzene, naphthalene, biphenyl, diphenyl ether, diphenylmethane, diphenyldimethylmethane, bisphenone, diphenyl sulphone, quinoline, pyridine, anthracene and phenanthrene.

25. The composition according to claim 1, wherein $R^9$, $R^{10}$ and $R^{11}$ are each independently a divalent aromatic or heteroaromatic group derived from at least one selected from the group consisting of benzene, naphthalene, biphenyl, diphenyl ether, diphenylmethane, diphenyldimethylmethane, bisphenone, diphenyl sulphone, quinoline, pyridine, anthracene and phenanthrene.

* * * * *